United States Patent
Price

(10) Patent No.: US 12,311,630 B2
(45) Date of Patent: May 27, 2025

(54) BALE PRESS

(71) Applicant: SP Press IP Pty Ltd, Walkerville (AU)

(72) Inventor: Stuart Price, Walkerville (AU)

(73) Assignee: SP Press IP Pty Ltd, Walkerville (AU)

( * ) Notice: Subject to any disclaimer, the term of this patent is extended or adjusted under 35 U.S.C. 154(b) by 0 days.

(21) Appl. No.: 18/639,270

(22) Filed: Apr. 18, 2024

(65) Prior Publication Data

US 2024/0262069 A1     Aug. 8, 2024

Related U.S. Application Data

(63) Continuation of application No. 16/976,262, filed as application No. PCT/AU2019/000026 on Feb. 28, 2019, now Pat. No. 11,987,019.

(30) Foreign Application Priority Data

Feb. 28, 2018  (AU) ................................ 2018900652

(51) Int. Cl.
| | |
|---|---|
| B65B 13/04 | (2006.01) |
| A01F 15/04 | (2006.01) |
| A01F 15/08 | (2006.01) |
| A01F 15/14 | (2006.01) |
| B30B 9/30 | (2006.01) |
| B65B 13/20 | (2006.01) |
| B65B 13/26 | (2006.01) |
| B65B 27/12 | (2006.01) |

(52) U.S. Cl.
CPC .......... *B30B 9/3007* (2013.01); *A01F 15/042* (2013.01); *A01F 15/0825* (2013.01); *A01F 15/145* (2013.01); *B30B 9/301* (2013.01); *B30B 9/3014* (2013.01); *B65B 13/04* (2013.01); *B65B 13/20* (2013.01); *B65B 13/26* (2013.01); *B65B 27/12* (2013.01)

(58) Field of Classification Search
CPC ... B30B 9/3007; B30B 9/3014; B30B 9/3078; B30B 9/301; B65B 13/04; B65B 13/20; B65B 13/22; B65B 13/26; B65B 27/12; A01F 15/042; A01F 15/005; A01F 15/145; A01F 15/0825
See application file for complete search history.

(56) References Cited

U.S. PATENT DOCUMENTS

| | | | |
|---|---|---|---|
| 4,090,440 | A | 5/1978 | Jensen |
| 4,151,793 | A | 5/1979 | Oosterling et al. |

(Continued)

FOREIGN PATENT DOCUMENTS

| | | |
|---|---|---|
| CN | 105228440 A | 1/2016 |
| EP | 0718193 A1 | 6/1996 |

(Continued)

*Primary Examiner* — Jimmy T Nguyen
(74) *Attorney, Agent, or Firm* — The Webb Law Firm

(57) ABSTRACT

A bale binder including a first row of binding applicators configured to apply a first plurality of spaced apart bindings around the bale of material, and a second row of binding applicators configured to apply a second plurality of spaced apart bindings around the bale of material, wherein the first and second row of binding applicators are configured such that the plurality of bindings from the respective applicators are applied around the bale of material without crossing over or tangling.

5 Claims, 24 Drawing Sheets

(56) References Cited

U.S. PATENT DOCUMENTS

| | | | |
|---|---|---|---|
| 4,718,336 A * | 1/1988 | Munro | B65B 13/28 |
| | | | 100/98 R |
| 4,951,562 A | 8/1990 | Ribaldo | |
| 5,175,981 A | 1/1993 | Gombos et al. | |
| 5,343,670 A | 9/1994 | Gombos et al. | |
| 5,699,727 A | 12/1997 | Schwelling | |
| 6,339,986 B1 | 1/2002 | Van Hierden | |
| 7,124,679 B2 | 10/2006 | Daniel et al. | |
| 7,497,158 B2 * | 3/2009 | Daniel | B65B 13/06 |
| | | | 100/3 |
| 8,590,945 B2 | 11/2013 | Schumacher et al. | |
| 9,832,932 B2 | 12/2017 | Schumacher et al. | |
| 2002/0023550 A1 | 2/2002 | Hierden | |
| 2002/0162480 A1 | 11/2002 | Winant | |
| 2004/0107673 A1 * | 6/2004 | Yarbrough | B65B 27/086 |
| | | | 53/399 |
| 2005/0055996 A1 | 3/2005 | Standlee | |
| 2006/0064942 A1 | 3/2006 | Toews | |
| 2009/0235628 A1 | 9/2009 | Derstine et al. | |
| 2015/0313087 A1 | 11/2015 | Acimas et al. | |
| 2016/0290798 A1 | 10/2016 | Verhaeghe et al. | |
| 2017/0190450 A1 | 7/2017 | Wildes et al. | |

FOREIGN PATENT DOCUMENTS

| | | |
|---|---|---|
| WO | 2011054360 A1 | 5/2011 |
| WO | 2013185832 A2 | 12/2013 |

* cited by examiner

BALE PRESS

CROSS-REFERENCE TO RELATED APPLICATIONS

This application is a continuation of U.S. patent application Ser. No. 16/976,262, filed Feb. 28, 2019, which is the United States national phase of International Application No. PCT/AU2019/000026 filed Feb. 28, 2019, and claims priority to Australian patent application Ser. No. 20/189, 00652 filed Feb. 28, 2018, the disclosures of which are hereby incorporated by reference in their entirety.

INCORPORATION BY REFERENCE

The following publications are referred to in the present application and their contents are hereby incorporated by reference in their entirety:

International Patent Application No. PCT/EP2009/007863 (WO/2011/054360) titled "DOUBLE-KNOT TWINE-KNOTTER UNIT FOR LARGE BALE PRESSES HAVING A PLURALITY OF DOUBLE-KNOT TWINE KNOTTERS COMBINED ON ONE KNOTTER DRIVE SHAFT" in the name of Rasspe Systemtechnik GmbH;

International Patent Application No. PCT/EP2012/061386 (WO/2013/185832) titled "TWINE KNOTTER" in the name of Rasspe Systemtechnik GmbH; and U.S. patent application Ser. No. 14/703,104 (US2015/0313087) titled "BALING PRESS WITH A ROPE TYING SYSTEM AND METHOD OF SUPPLYING ROPE TO A KNOTTER OF A BALING PRESS" in the name of Bollegraaf Patents and Brands B.V.

TECHNICAL FIELD

The present disclosure relates to a bale press for compressing and binding material. In a particular form the present invention relates to a bale press comprising a bale binder for binding bales of material.

BACKGROUND

Material to be compressed can include waste material (such as paper and/or cardboard) or animal feed (such as hay or straw) that is pressed from a loose state to a compressed state (for example, in a vertical baler for waste material, or a field baler for animal feed) where it is bound thereby holding the material in a compressed state. The pressing may occur on one axis, that is, between two opposing surfaces, where the binding may include a number of straps or ties that locate around the compressed material to resist expansion along the axis of compression. Binding typically occurs while the material is under compression in order to ensure that the compressed material does not expand prior to binding.

It is desirable that an existing bale of compressed material is further compressed in order to further decrease its size or volume. The need to further compress a bale of compressed material may arise when the compressed material is to be transported in an intermodal container, having defined internal dimensions and a maximum cargo weight limit.

Existing bale presses are configured to press bales to a pre-set position. For example, a standard sized bale of hay is placed in a press that further compresses the bale to a pre-set dimension. This is regardless of the weight or density of the starting bale, and is often necessary for the bale press to be able to bind the resultant compressed bale. Where there is a variation in the weight of each bale, compression to a predetermined dimension will possibly lead to over compression in the case of a bale having a heavy starting weight. Such a bale already has a significant extent of compression so that further compression to a pre-set size may lead to over compression with the hay being formed into sections that are a solid mass that cannot or are difficult to separate at the time of being consumed.

Existing bale presses are configured to press individual bales to a pre-set dimension where the overall dimensions of a plurality of stacked bales is approximately equal to the internal dimensions of the container, such that the container is filled with minimal wasted internal space. However, a problem with these existing bale presses is that while they are capable of filling a container with minimal wasted internal space, they do not account for the variability in weight or density of each bale, and this variability in weight may result in a container being under or over filled by weight. That is, the combined weight of the individual bales in the container may fall over or below the maximum cargo weight limit for the container.

No bale presses are known that are capable of variably compressing and binding a bale of material to various sizes, such that the container may be filled with minimal wasted internal space, and that the combined weight of the individual bales is maximised, without exceeding the maximum cargo weight limit for the container.

A further problem with existing bale presses includes providing a means of easily applying the binding to the resultant compressed bale. There is a need to ensure that the binding system is simple and effective in operation as well as being capable of being performed in an automated manner rather than requiring manually performed steps. Existing bale presses will typically apply the binding material to the bale in a secondary operation after compression has occurred, which increases the time it takes for a compressed and bound bale to be produced.

A further problem with existing bale presses is the binding material being capable of withstanding the expansive forces exerted upon it by the compressed bales. Conventionally this has been addressed by increasing the number of strings or straps, the maximum number of strings or straps able to be used being limited by the size of the bale, the size of the respective binding material applicators and how many applicators are able to be arranged side by side across the compressed bale. For instance, existing bale knotters are limited to a maximum of eight strings being able to be applied across a standard 1200 mm width bale.

It is against this background and the problems and difficulties associated therewith that the present disclosure has been developed.

SUMMARY

According to a first aspect, there is provided a bale binder comprising a first row of binding applicators configured to apply a first plurality of spaced apart bindings around a bale of material, and a second row of binding applicators configured to apply a second plurality of spaced apart bindings around the bale of material, wherein the first and second row of binding applicators are configured such that the plurality of bindings from the respective applicators are applied around the bale of material without crossing over or tangling.

In one form, the first and second row of binding applicators are misaligned from one another such that the bindings from each of the first and second applicators are applied in an alternating fashion across the width of the bale.

In one form, the binder further comprises a receiving channel, having first and second parallel surfaces separated by a defined distance, the receiving channel having a first opening at one end and a second opening at an opposing end, wherein the bale of material to be bound is pushed in through the first opening between the first and second surfaces, and wherein the bound bale is pushed out through the second opening.

In one form, bindings from both the first and second row of binding applicators extend between the first and second surfaces of the receiving channel so that as the bale of material is pushed in between the first and second surfaces, each of the bindings are drawn around the bale of material such that they are located over a first end and along first and second sides of the bale.

In one form, the bale binder further comprises a first row of connecting devices configured to connect ends of each of the first plurality of bindings to form a first plurality of complete loops around the perimeter of the bale, and a second row of connecting devices configured to connect ends of each of the second plurality of bindings to form a second plurality of complete loops around the perimeter of the bale.

In one form, each of the bindings are a twine, and wherein the first and second row of connecting devices are in the form of a plurality of double-knot twine knotters mounted next to one another in a row along a common driveshaft.

In one form, the bale binder further comprises one or more additional rows of binding applicators.

According to a second aspect, there is provided a bale press for compressing and binding bales of material, the bale press comprising a bale binder as described above.

BRIEF DESCRIPTION OF DRAWINGS

Embodiments of the present invention will be discussed with reference to the accompanying drawings wherein.

DESCRIPTION OF EMBODIMENTS

Figure 1:
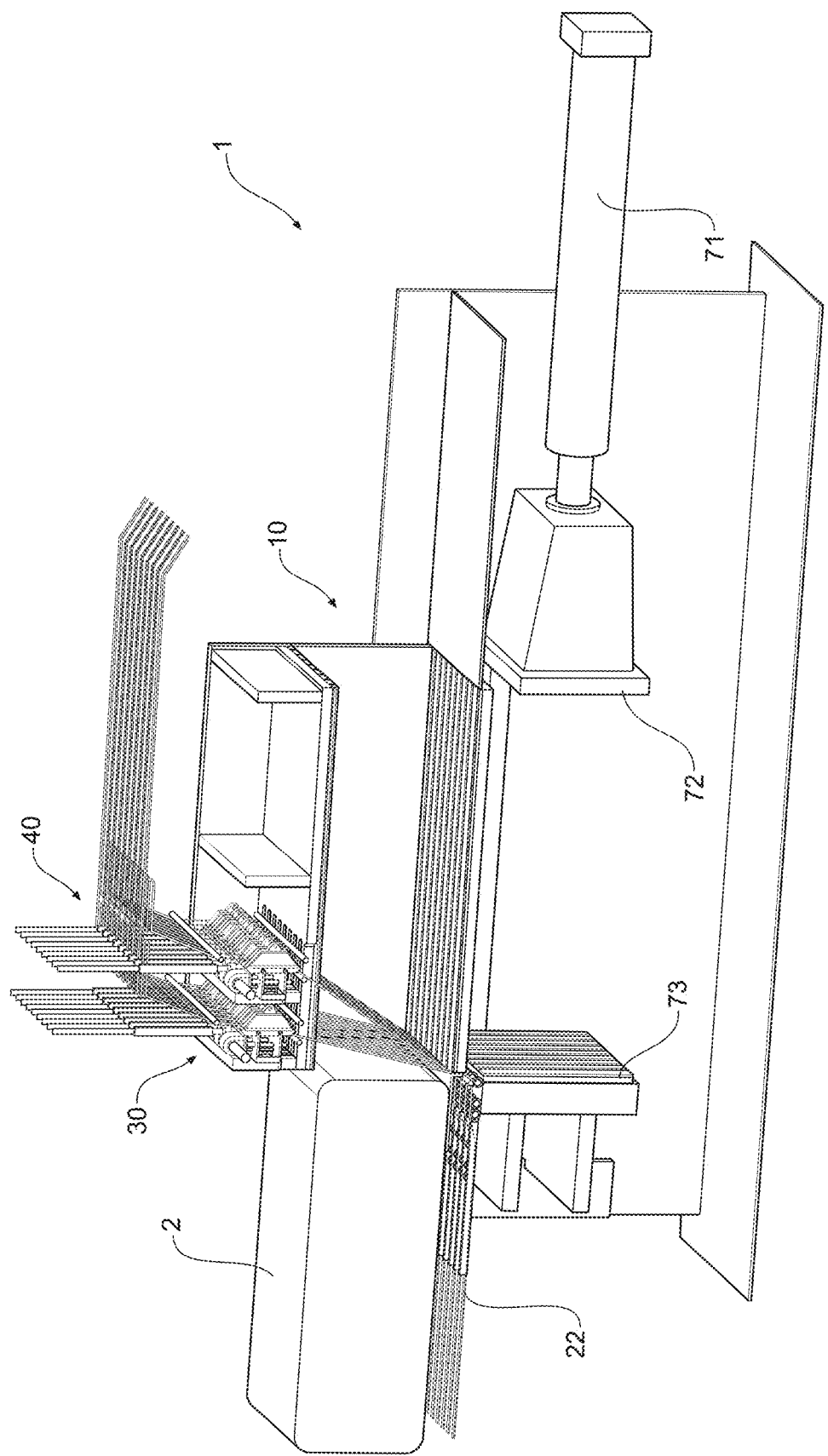
FIG. 1 is a perspective cross-sectional schematic view of a bale press, according to an embodiment.

Referring now to FIG. 1, there is shown a bale press 1 comprising a press 70 configured to compress a bale of material 2 to a required compressed dimension, a binding applicator configured to apply a plurality of bindings 20 around the bale of material 2, and a connecting means for connecting ends of each of the bindings 20 to form a plurality of complete loops around the perimeter of the compressed bale 2 so that the plurality of loops act to hold the bale 2 in its compressed state, wherein the binding applicator acts to withdraw excess binding 20 as the press 70 compresses the bale 2, prior to the connecting means connecting the ends of the bindings 20.

Figure 2:
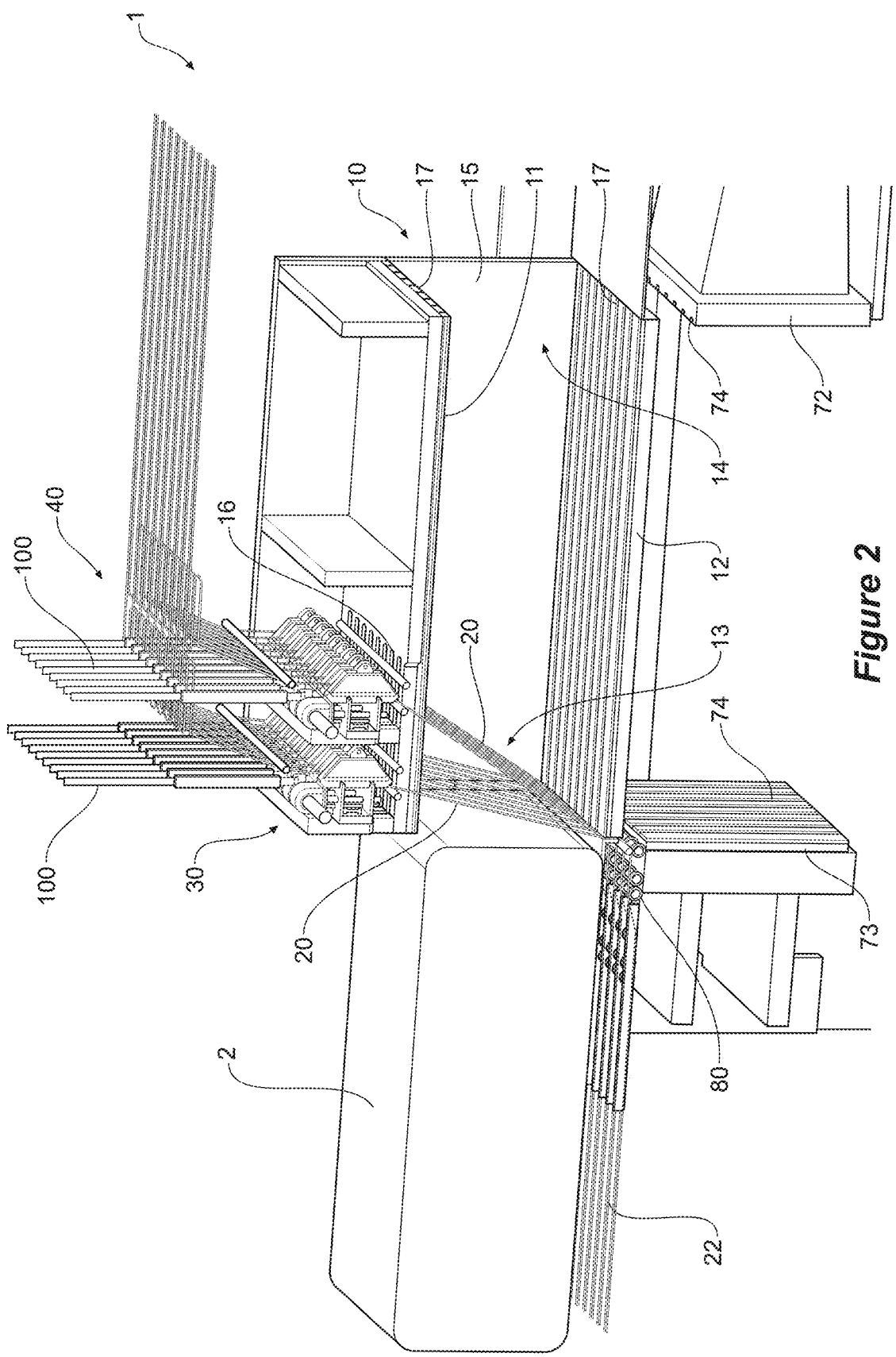
FIGS. 2 to 17 are perspective cross-sectional schematic views of the bale press of FIG. 1, showing the sequence of a bale of material entering the bale press, undergoing binding and compression, and exiting the bale press.

Referring to FIG. 2, it can be seen that the bale press 1 comprises a receiving means in the form of a receiving channel 10 having first and second parallel surfaces 11, 12 separated by a defined distance, the receiving channel 10 having a first opening 13 at one end and a second opening 14 at an opposing end, where the bale of material 2 which is to be compressed is pushed in through the first opening 13 between the first and second surfaces 11, 12. The receiving channel 10 also has a first side wall 15 and a second side wall (not shown).

Figure 3:
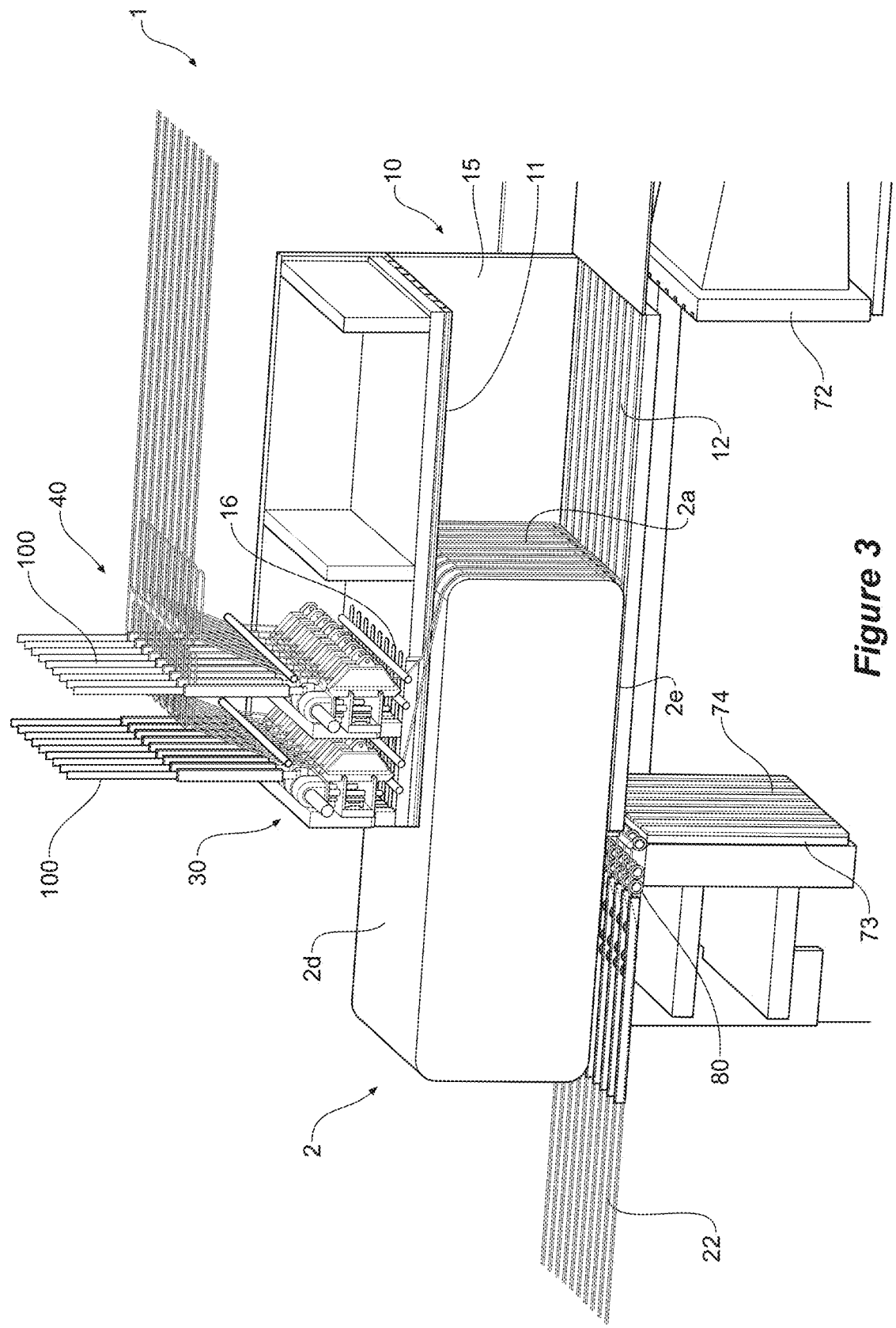
Figure 4:
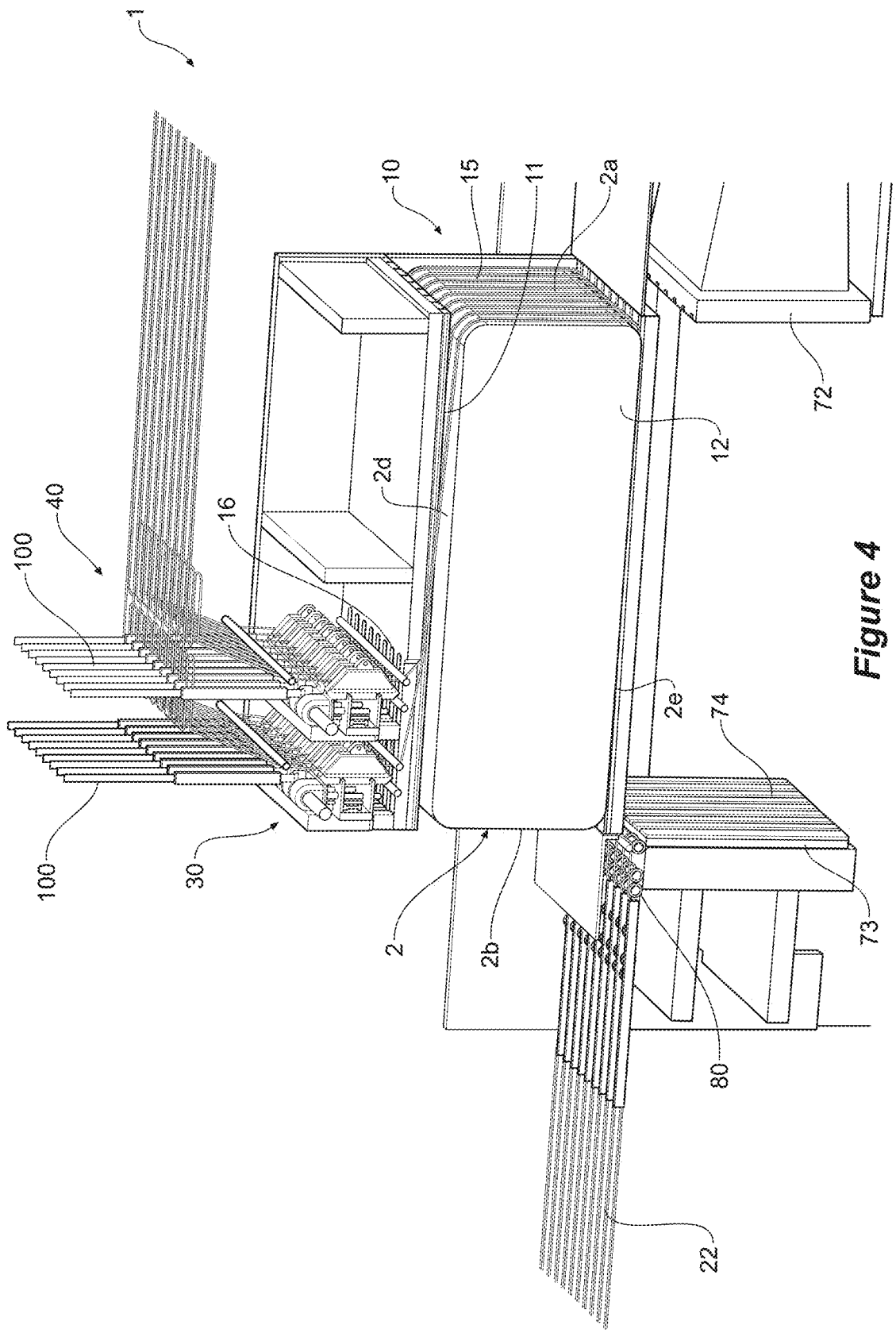

Referring to FIGS. 2 to 4 it can be seen that the bale press 1 comprises a plurality of elongate bindings 20 extending between the first and second surfaces 11, 12 so that as the bale of material 2 is pushed in between the first and second surfaces 11, 12 the bindings 20 are drawn around the bale of material 2 such that they locate over a first end 2a and along first and second sides 2d, 2e of the bale 2.

For ease of understanding and clarity, the following description, unless stated otherwise, will describe a single binding 20 and its interactions with the bale 2 and various components of the bale press 1.

In this embodiment the binding 20 is a twine, however it will be appreciated that any type of elongate binding material could be used, such as string, a polymer cord or strip, or a metal wire.

Each binding 20 is delivered to the receiving channel by a binding applicator which comprises a first binding supply and a second binding supply 22. Binding from the first binding supply passes through a connecting means 30 (discussed in further detail below) and through a slot 16 in the first surface 11 of the receiving channel 10. Binding from the second binding supply 22 passes through a roller mechanism 80 (discussed in further detail below) wherein the binding material first and second binding supply is connected together within the receiving channel 10, such that there is a continuous length of binding 20 extending from the first supply to the second supply 22.

In one form, the first and second binding supplies are reels (not shown), which allow the binding to be wound off the reels as binding is drawn over the bale 2.

In the embodiment shown, the connecting means is in the form of a row of double-knot twine-knotters 30 similar to that described in PCT/EP2009/007863, wherein each double-knot twine-knotter comprises a knotter assembly 31 which forms two knots following one another from binding supplied by the first and second binding supplies, and a blade 32 which cuts the binding 20 between the two knots, such that a complete loop of binding 20 is formed around a compressed bale, and the binding supplied by first and second binding supplies is reconnected for binding the subsequent bale.

It will also be appreciated that depending on the width of the bale and its degree of compression, two or a plurality of double-knot twine knotters and bindings are mounted next to one another in a row on a common driveshaft. It will be appreciated that for each knotter, there is a corresponding binding and first and second binding supply. It can be seen that in the embodiment shown, there are nine knotters 30 mounted next to one another along a common driveshaft, such that nine bindings are able to be applied around the bale. While existing knotters have only been able to apply 8 bindings around a standard 1200 bale, the application of an additional binding is made possible due to the width of the bale increasing as the bale is longitudinally compressed.

It can also be seen that in the embodiment shown, there is a second row of knotters 40 mounted adjacent to the first row of knotters 30 on top of the first surface 11 of the receiving channel 10. The use of two rows of knotters allows for an even higher degree of bale compression than a single row of knotters, with the embodiment shown capable of providing a total of 18 loops of binding for holding the bale in a compressed state. It will also be appreciated that in addition to being able to withstand higher degrees of bale compression, the use of a higher number of bindings distributed across the width of the bale has other benefits such as improved retention of bale material.

Figure 19:
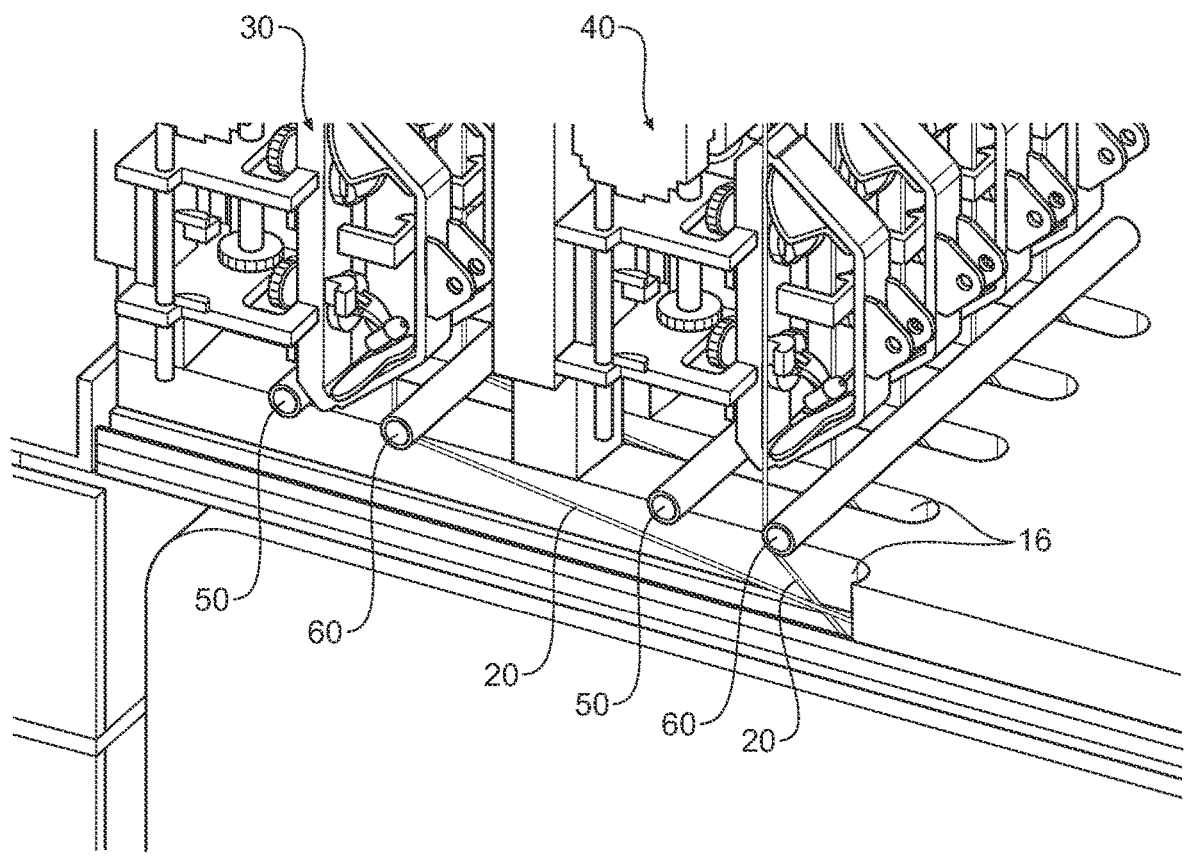
FIG. 19 is a detail perspective cross sectional view of a portion of the bale press of FIG. 1, showing the relationship between the first and second rows of bindings.

As can be seen in FIG. 19, the first and second rows of knotters 30, 40 are slightly staggered from each other, such that their respective bindings pass through common slots 16 in the first surface 11 of the receiving channel 10, without crossing over or tangling.

It will be appreciated that any type of connecting device could be used which will be capable of forming two connections between the first and second binding material supplies.

Figure 21:
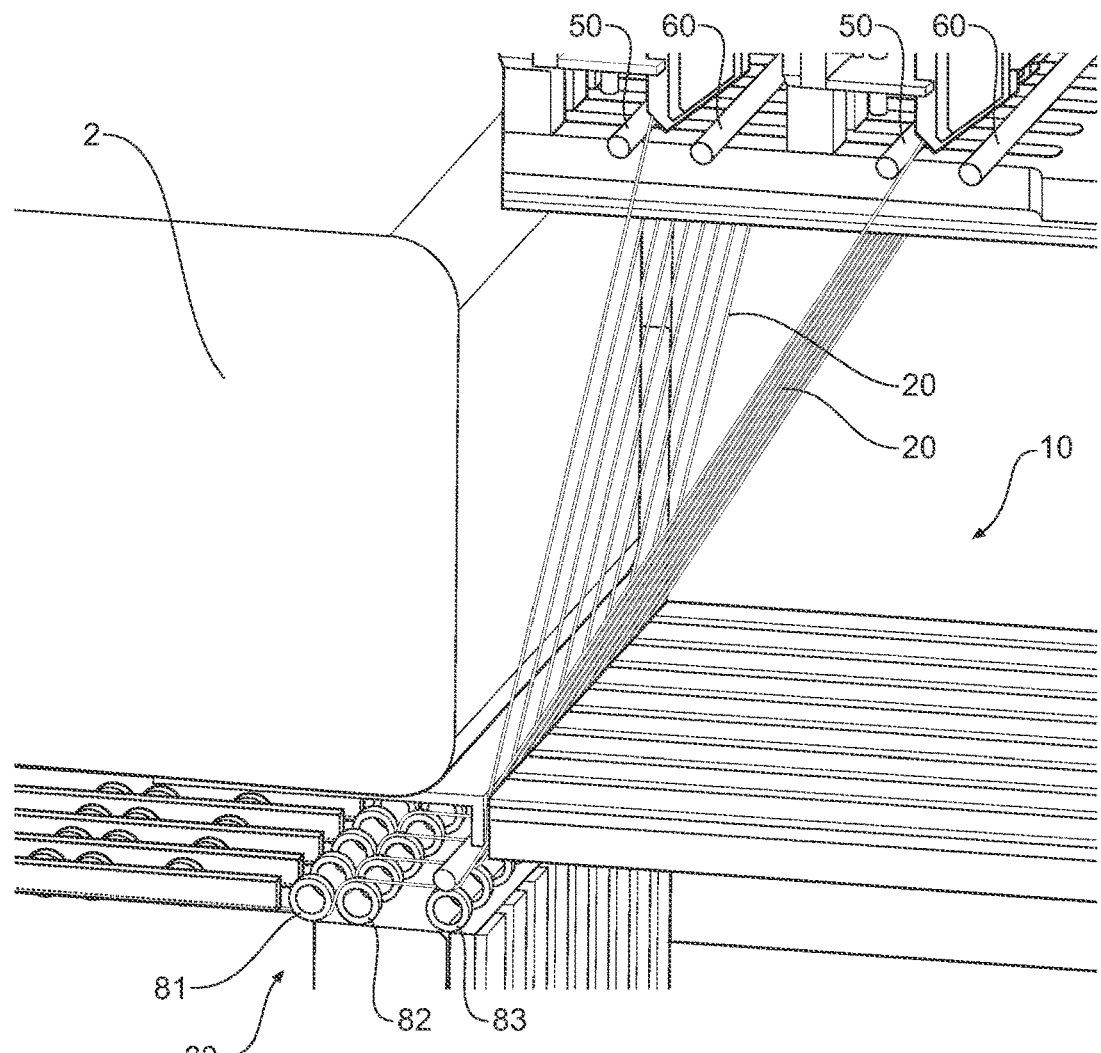
FIG. 21 is a detail perspective cross-sectional view of a portion of the bale press of FIG. 1, showing the roller mechanism in a first position and the receiving channel in a first position, prior to receiving a bale.
Figure 22:
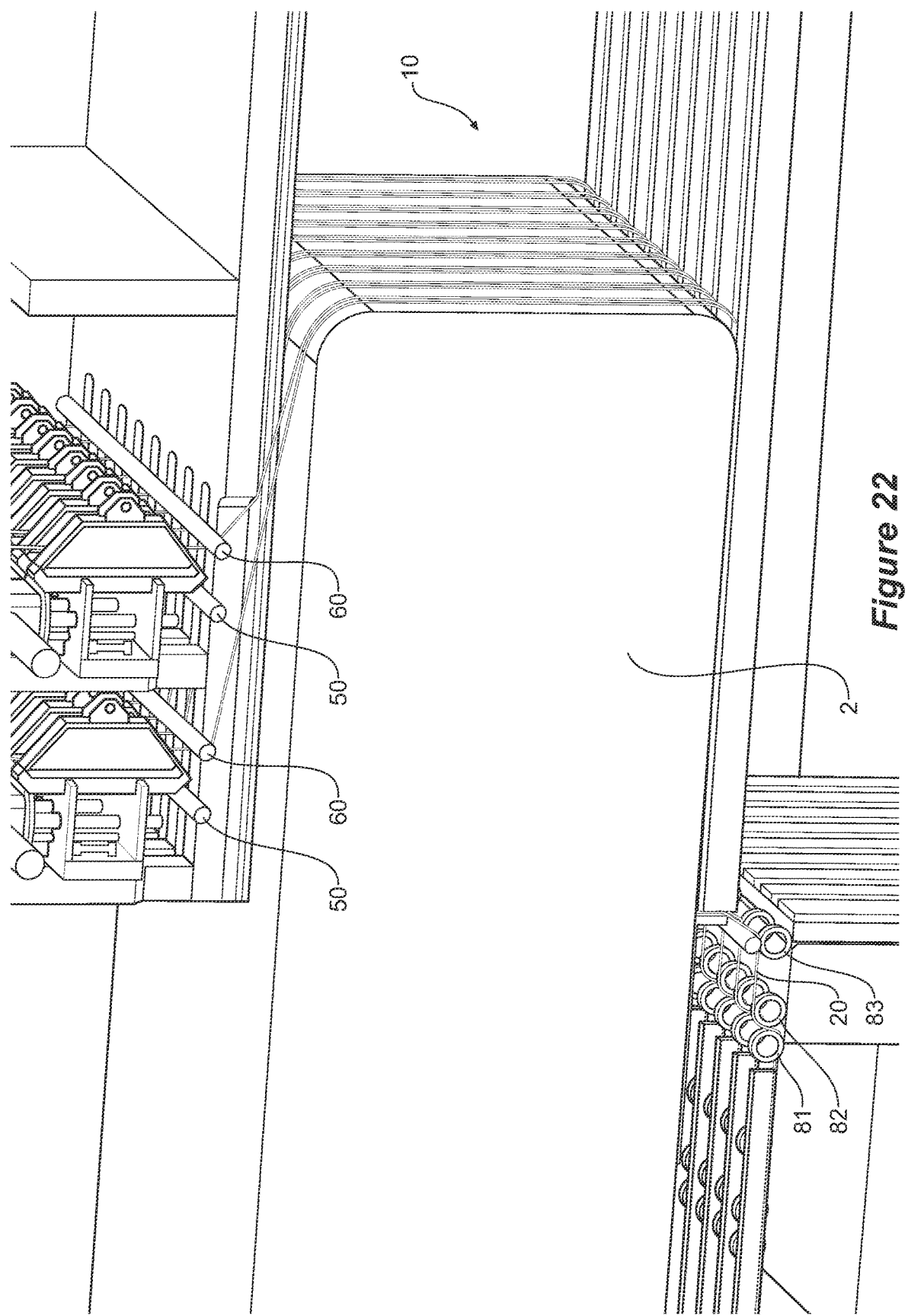
FIG. 22 is a detail perspective cross-sectional view of a portion of the bale press of FIG. 1, showing the roller mechanism in a first position and the receiving channel in a first position, the receiving channel having partially received a bale.
Figure 23:
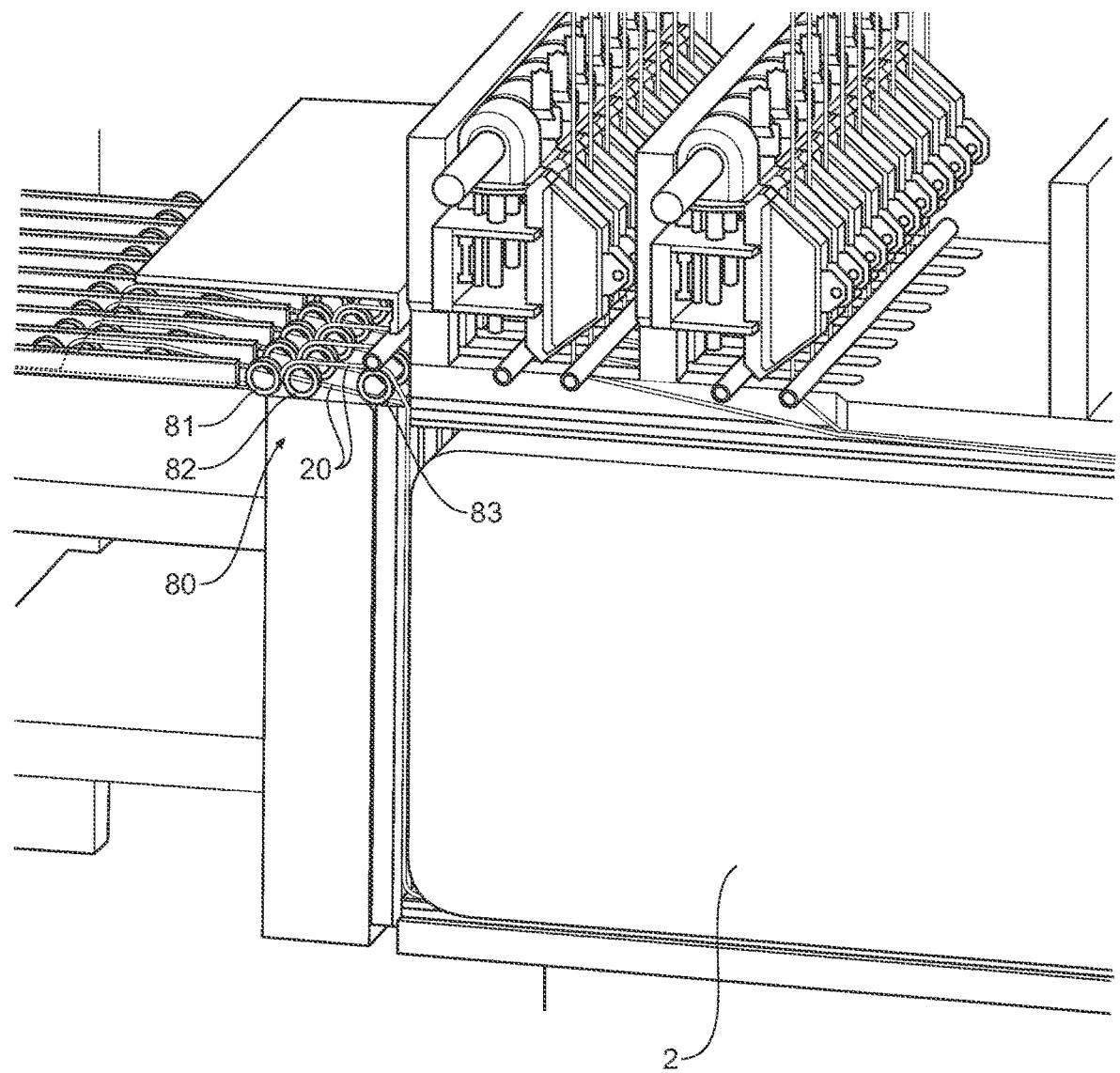
FIG. 23 is a detail perspective cross-sectional view of a portion of the bale press of FIG. 1, showing the roller mechanism in a first position and the receiving channel in a second position.

Below each row of knotters there is located a first guide rod 50 and a second guide rod 60 (as best shown in FIG. 22) that constrain the movement of the binding 20 relative to the knotter, where the first guide rod 50 restricts the binding 20 from moving toward the first opening 13 of the receiving channel 10 (as best shown in FIG. 21) and the second guide rod 60 restricts the binding 20 from moving toward the second opening 14 of the receiving channel 10 (as best shown in FIGS. 22 and 23). This is necessary for the operation of the knotter.

Figure 5:
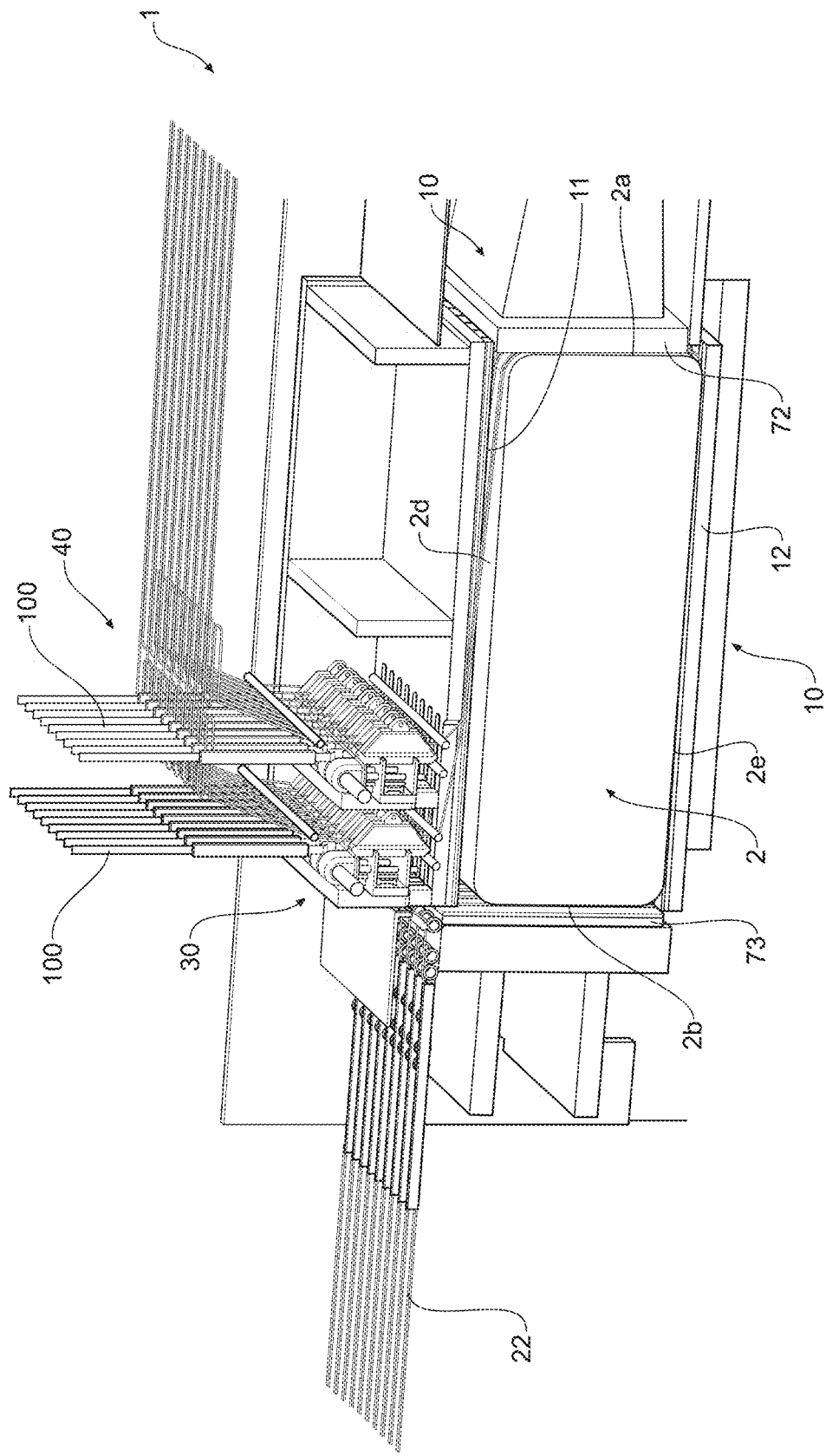

As shown in FIGS. 4 to 5, the receiving channel 10 is moveable in a direction transverse to its longitudinal axis from a first position where it is configured to receive and eject bales, to a second position where the plurality of bindings 20 extend over the second end 2b of the received bale 2, such that the plurality of bindings 20 are applied around all four sides of the bale.

Figure 6:
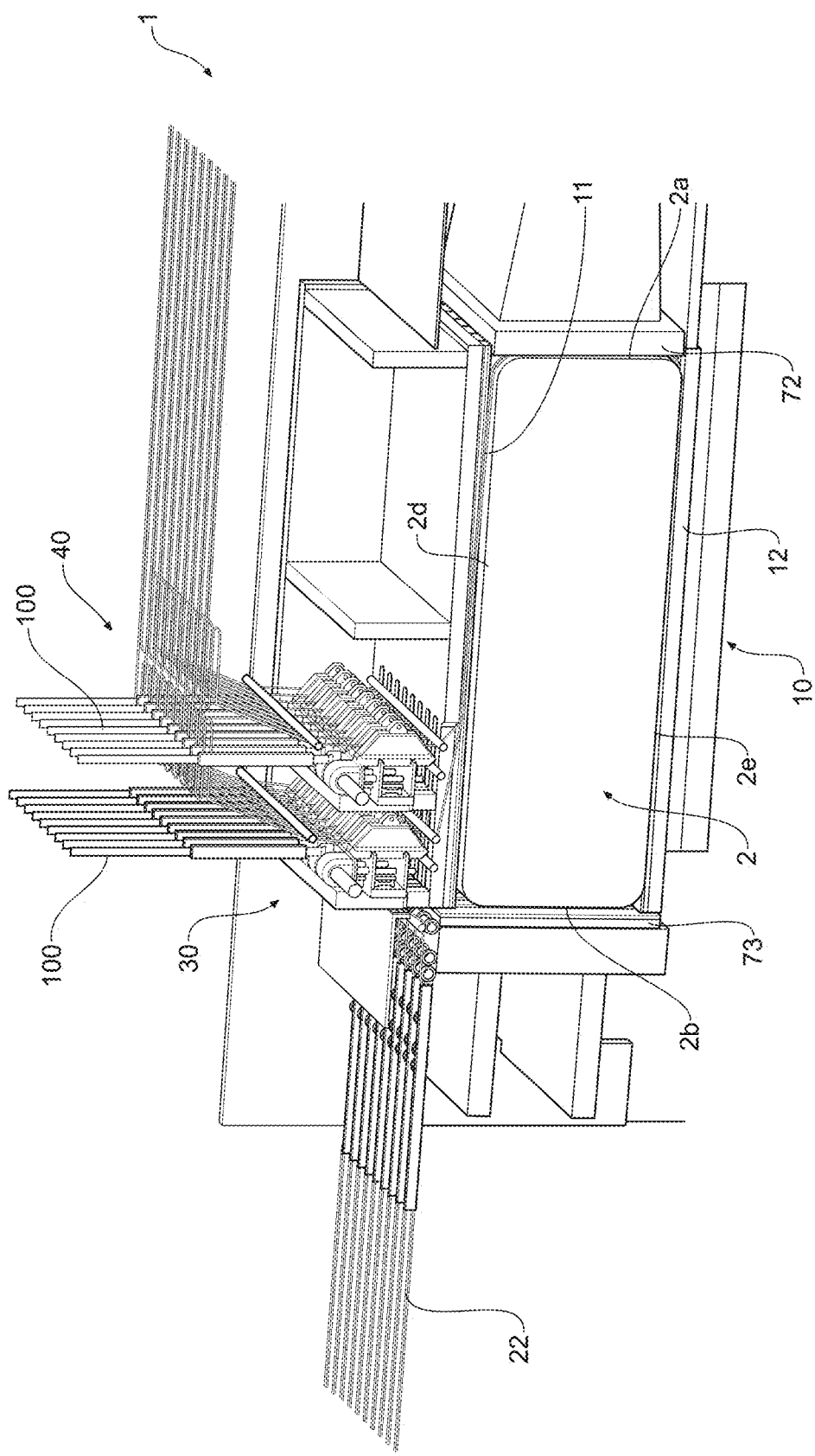

As shown in FIG. 6, it can be seen the second surface 12 of the receiving channel 10 maybe configured to move toward the first surface 11 in order to reduce the height of the bale 2 if required. This movement of the second surface 12 maybe achieved through the use of an additional hydraulic press arrangement or suitable mechanical alternative, such as a cam/follower arrangement.

The bale press 1 further comprises a press 70 configured to compress the bale 2 to a required compressed dimension. As shown in FIGS. 7 to 16, the press 70 acts through the first and second openings 13, 14 of the receiving channel 10 to compress the bale 2 along the longitudinal axis of the channel 10.

Figure 7:
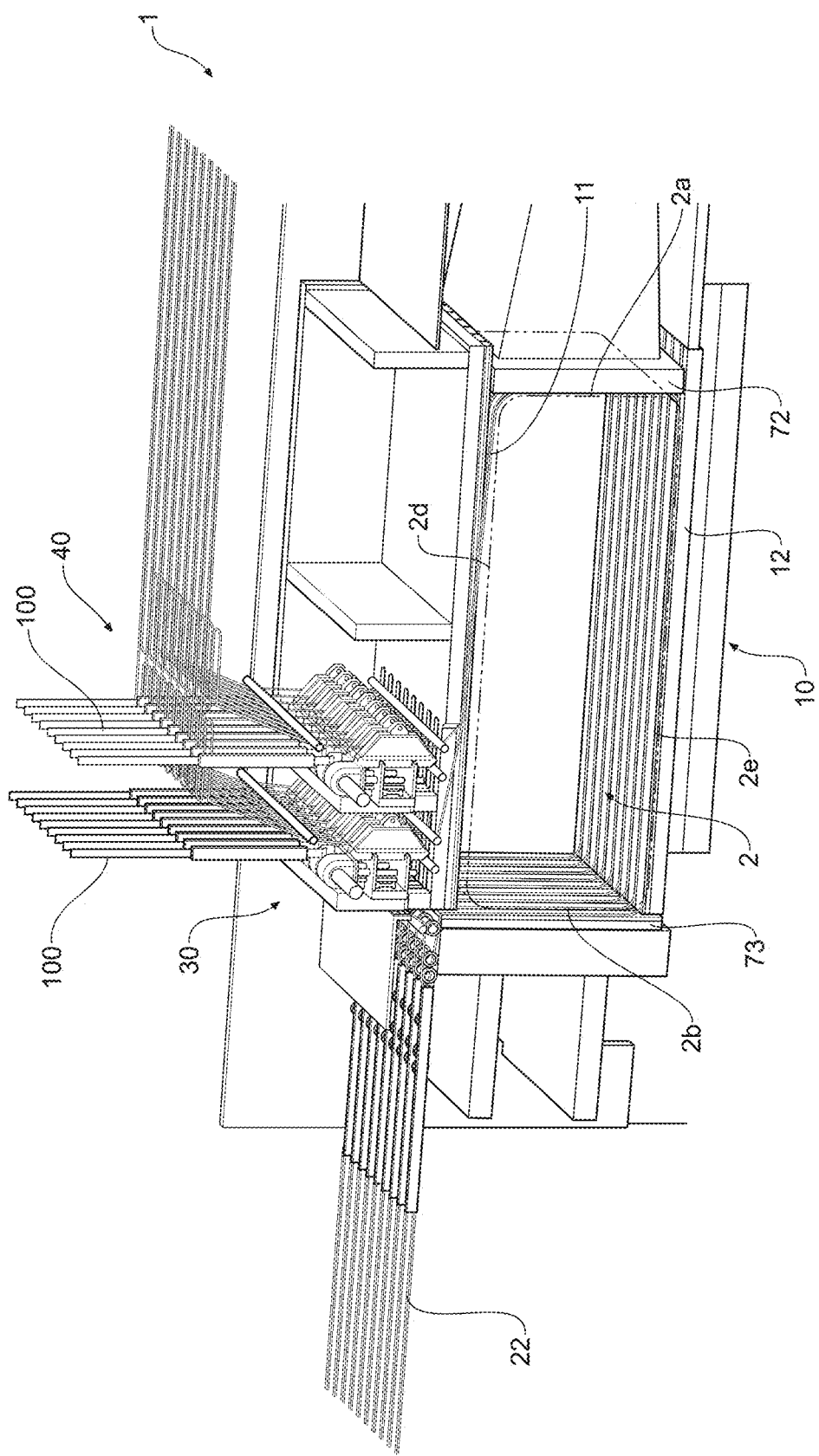
Figure 8:
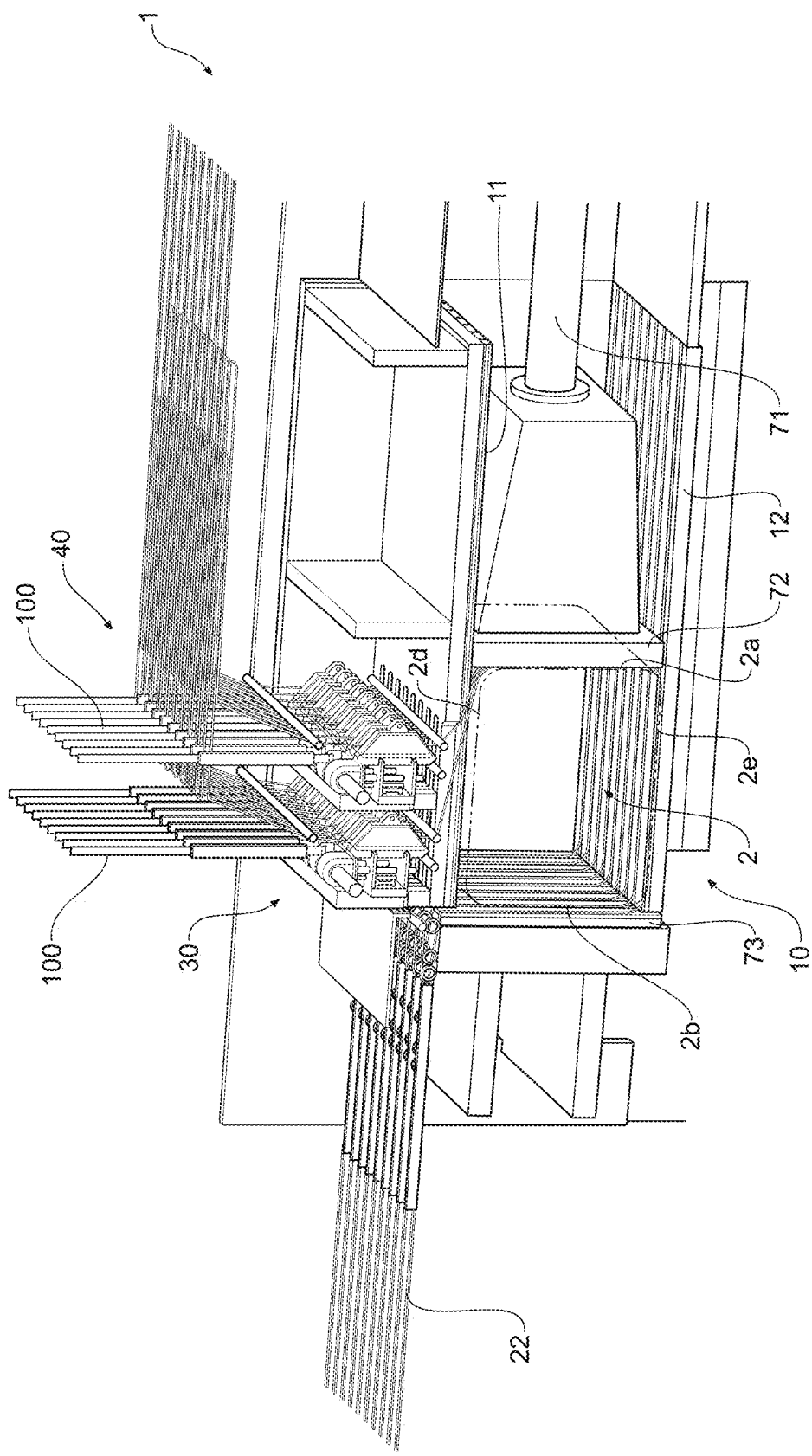
Figure 9:
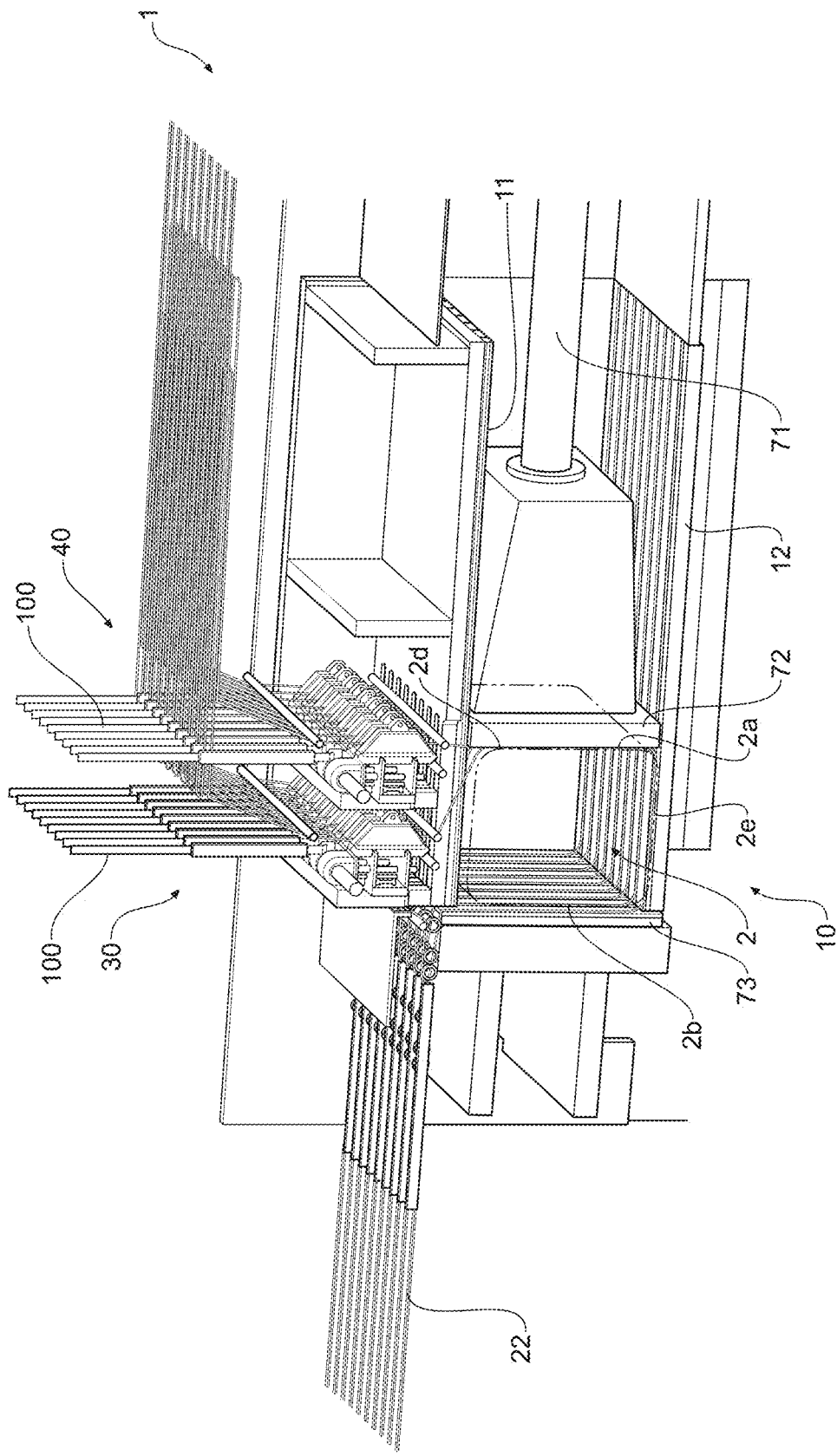

The press 70 is powered by at least one hydraulic cylinder 71 which drives a platen 72 through the second opening 14 of the receiving channel 10 and toward a fixed end plate 73 located adjacent to the first opening 13 of the receiving channel 10, such that the bale 2 is compressed between the platen 72 and end plate 73 (as best shown in FIGS. 7 to 9). The binding applicator further comprises a means for withdrawing excess binding from around the bale 2. It can be seen that as the press 70 compresses the bale 2, the perimeter of the bale 2 reduces, and the binding applicator acts to withdraw excess binding 20 from around the bale 2. The withdrawal of the excess binding 20 maybe synchronised with the movement of the platen 72 through the use of linear encoders (or other suitable alternatives) on the hydraulic cylinder 71 to detect the displacement of the hydraulic cylinder 71 and the platen 72.

In the Figures provided, withdrawal of the excess binding is diagrammatically illustrated with a loop 23 of excess binding being drawn from above the knotter 30, 40 while the second binding supply 22 prevents further binding being drawn. In one form, the supply and withdrawal of excess binding could be achieved directly by one or both of the first and second binding supplies. In one form, each of the first and second binding supplies may comprise a binding control device, capable of controlling the supply and withdrawal of binding material, as well as controlling the degree of tension of the binding material.

The withdrawal of excess binding 20 from around the bale 2 is facilitated by galleries 17, 74 (shown in FIG. 2) in the first and second surfaces 11, 12 of the receiving channel 10, and on the end plate 73 and platen 72 of the press 70, wherein the galleries provide a continuous channel around the perimeter of the bale 2, which allow the bindings 20 to move freely around the perimeter of the bale 2.

Figure 18:
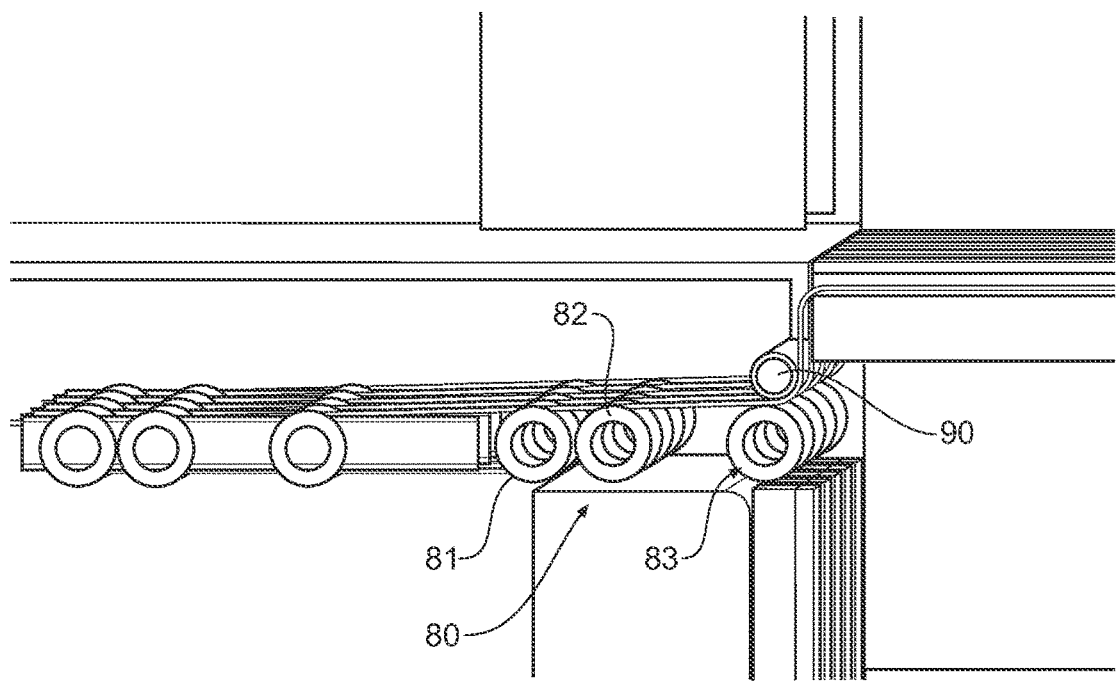
FIG. 18 is a detail perspective cross-sectional view of a portion of the bale press of FIG. 1, showing the roller mechanism and guide rod when the roller mechanism is in a first position and the receiving channel is in a first position, having received a bale.
Figure 20:
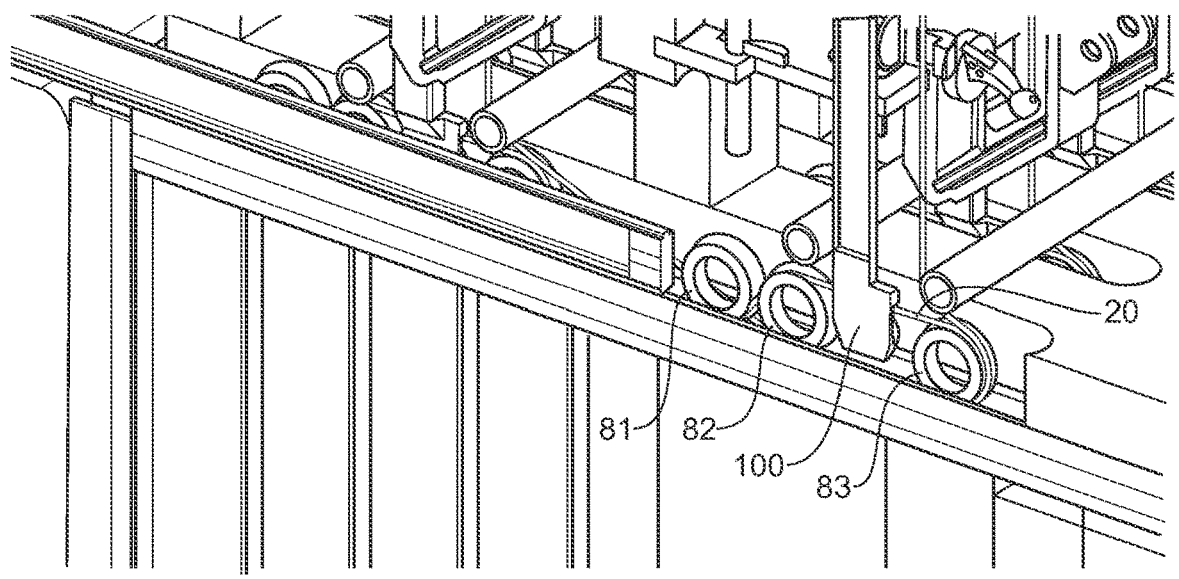
FIG. 20 is a detail perspective cross-sectional view of a portion of the bale press of FIG. 1, showing the relationship between the roller mechanism and hook element when the roller mechanism is in an extended position.

As described above, the second supply of binding material supplies the binding 20 via a roller mechanism 80. The roller mechanism 80 comprises a first, second and third roller 81, 82, 83 which acts to guide the binding 20 from the second supply to the receiving channel 10. As best shown in FIG. 18, when the receiving channel 10 is in its first position, the binding 20 is fed under the first roller 81, over the second roller 82 and toward a guide rod 90 which guides the binding 20 up toward the receiving channel 10. As best shown in FIG. 23, when the receiving channel 10 is in its second position, the binding 20 is fed under the first roller 81, over the second roller 82, and over the third roller 83 which guides the binding 20 down toward the receiving channel 10. The roller mechanism 80 is moveable between a first position (as shown in FIGS. 1 to 9) and a second position (as shown in FIGS. 10 to 13 and FIG. 20) where the roller mechanism 80 extends into the slot 16 provided in the first surface 11 when the receiving channel 10 is in its second position, where it guides the binding 20 to a position underneath the knotter 30. As best shown in FIG. 20, there is a gap between the second and third rollers 82, 83, which allows a hook element 100 to fit between the rollers 82, 83 and pick up the binding 20 and pull it through the knotter 30 to enable the double knotting process to take place. The rollers 82, 83 ensure that the binding 20 is in the correct position for the hook element 100 to pick it up.

Figure 10:
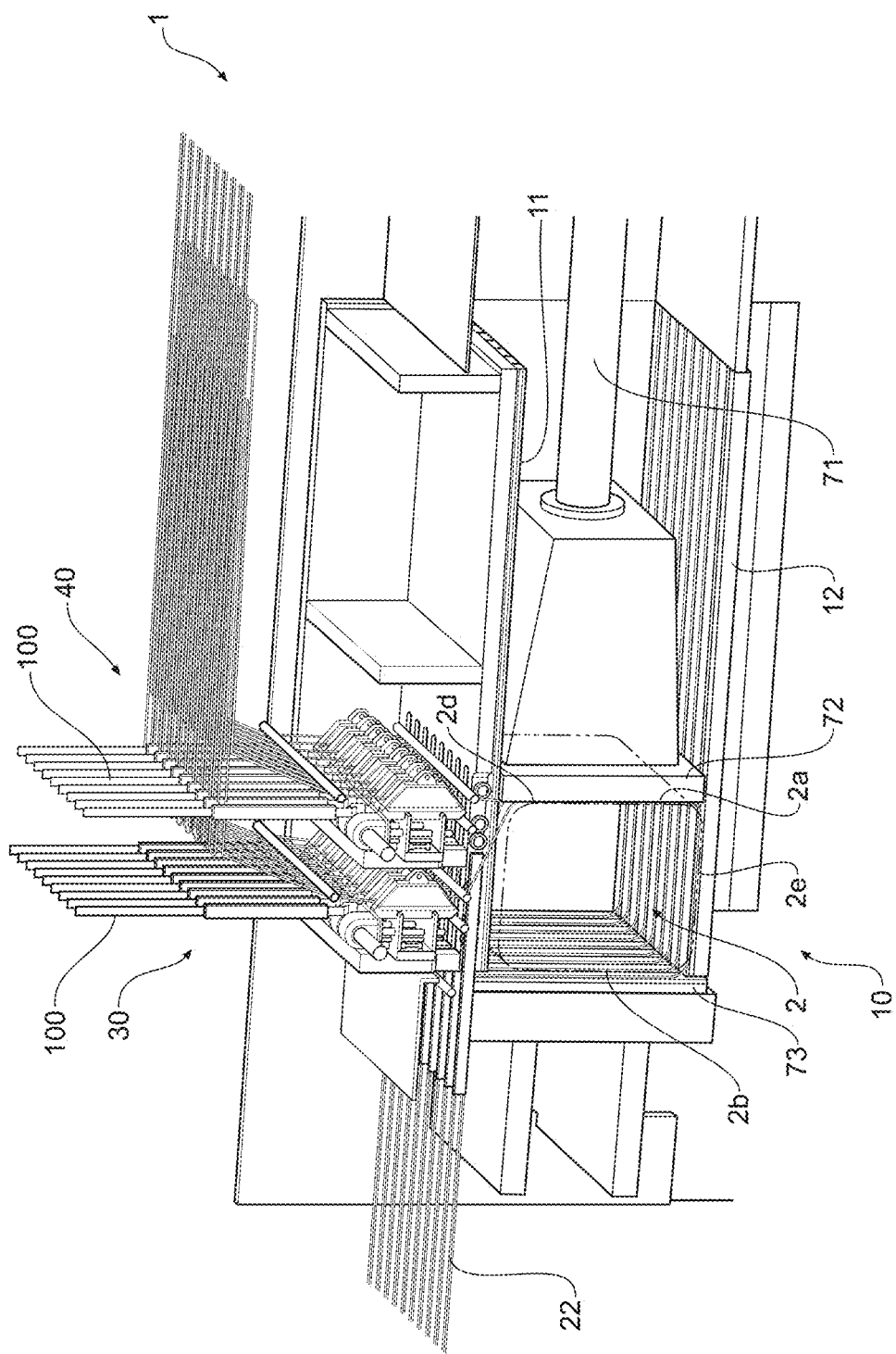
Figure 11:
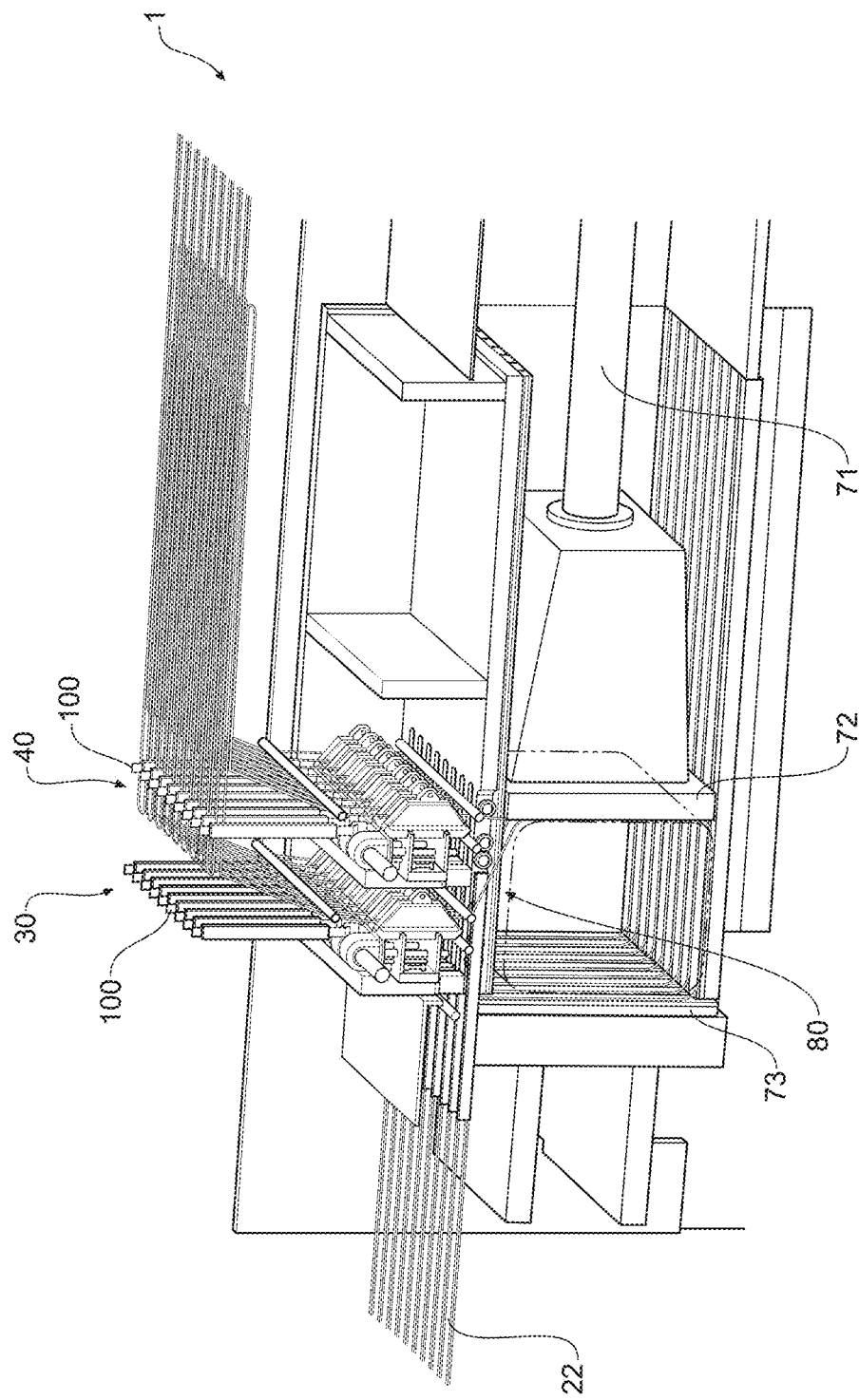
Figure 12:
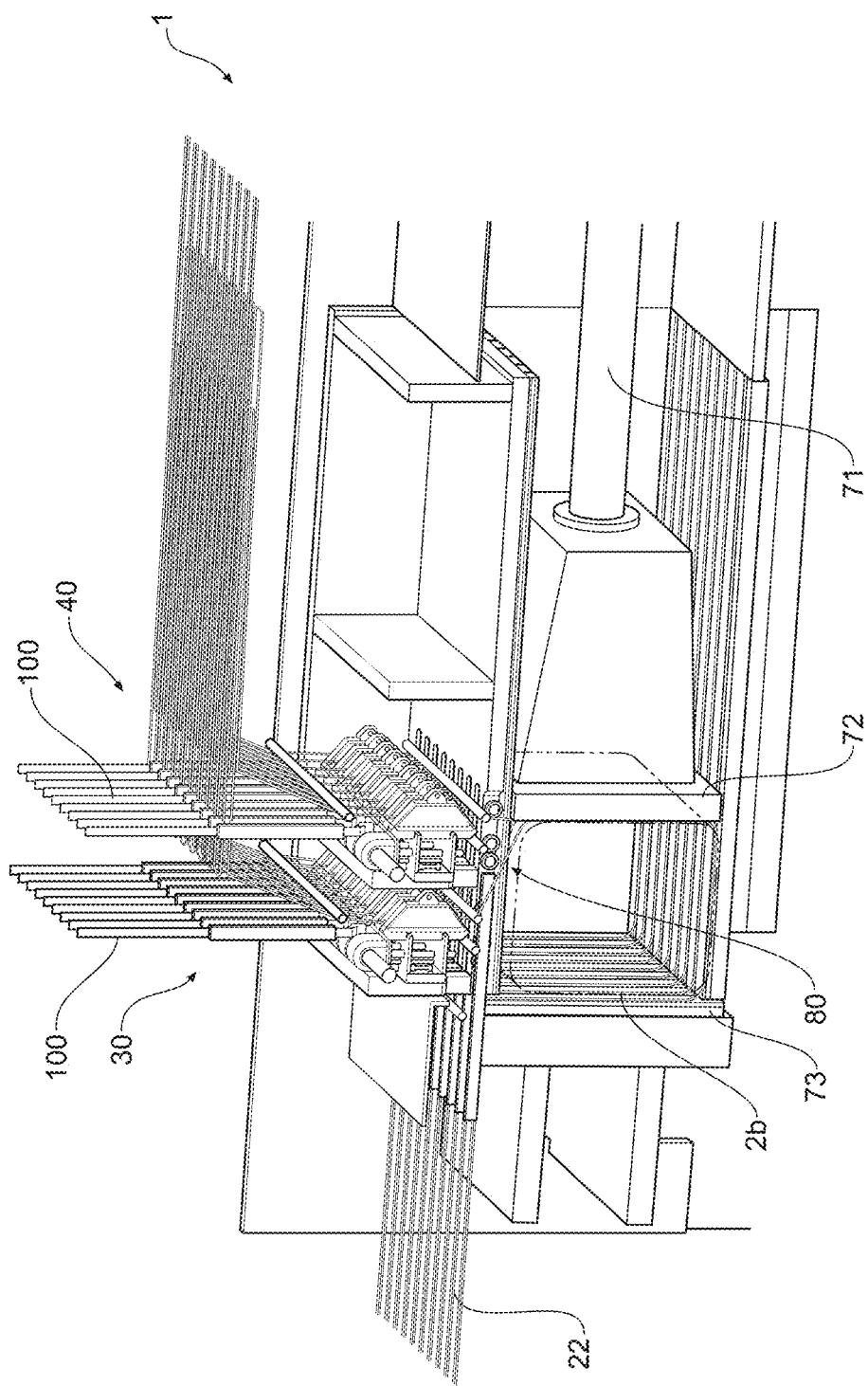

As shown in FIGS. 10 to 12, the hook element 100 is configured to pass through the knotter 30 and in to the slot 16 in the first surface 11, where it picks up the binding 20 and draws it back through the knotter 30, where the knotter 30 then performs the double knotting operation to form a complete loop around the perimeter of the compressed bale 2 in order to hold the bale 2 in its compressed state, and to maintain the connection of the binding 20 ready for receiving a subsequent bale.

Figure 13:
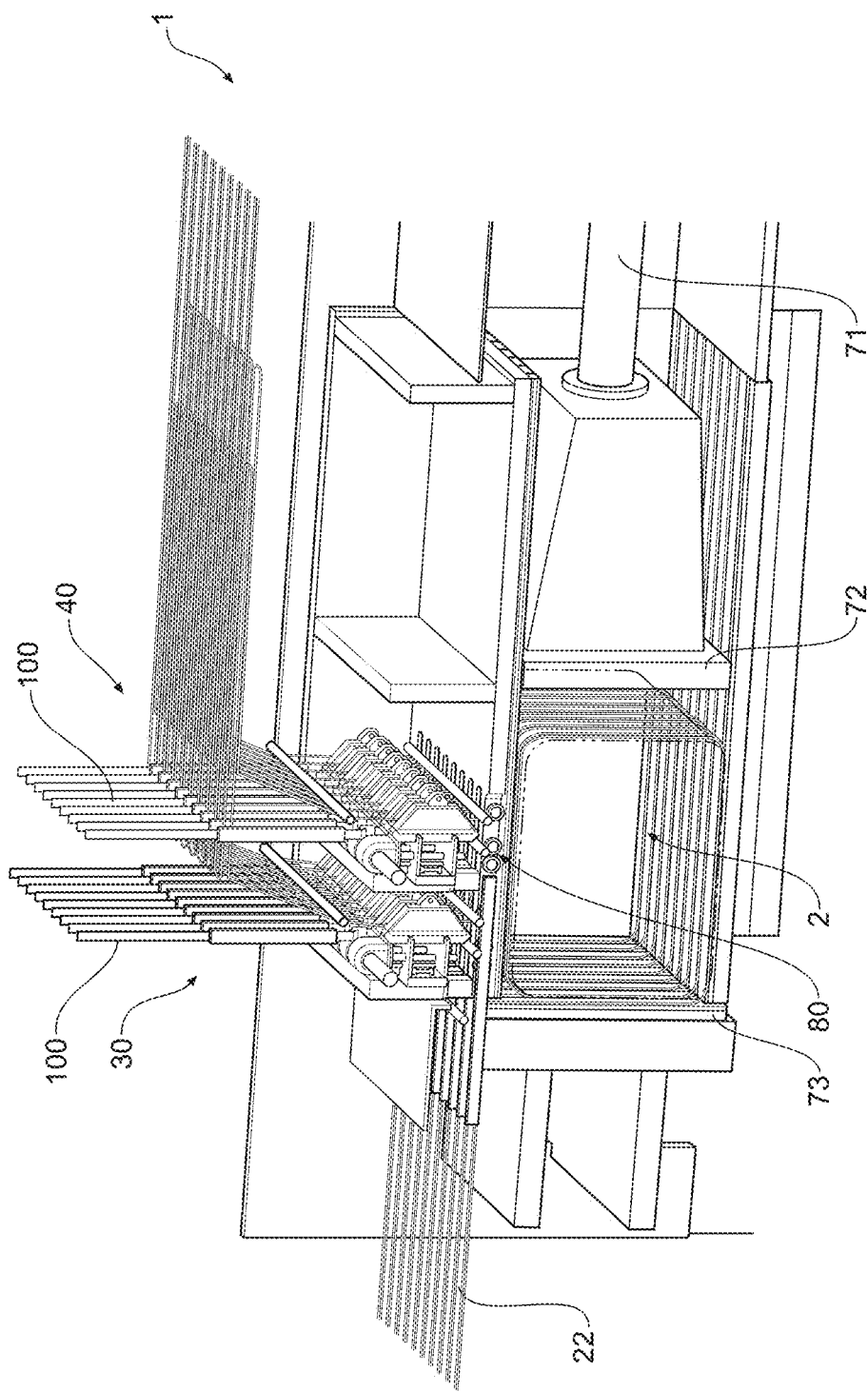
Figure 14:
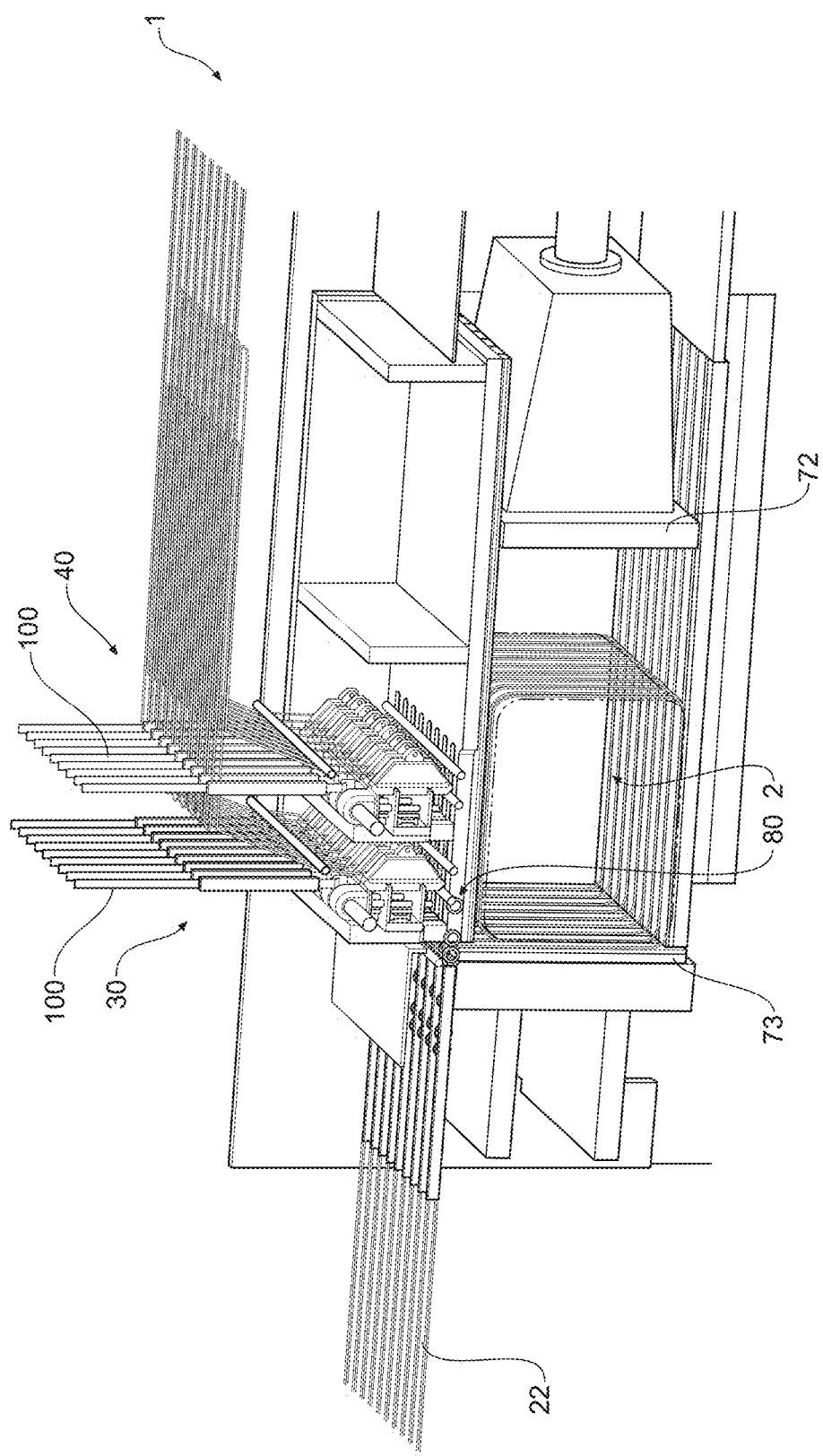
Figure 15:
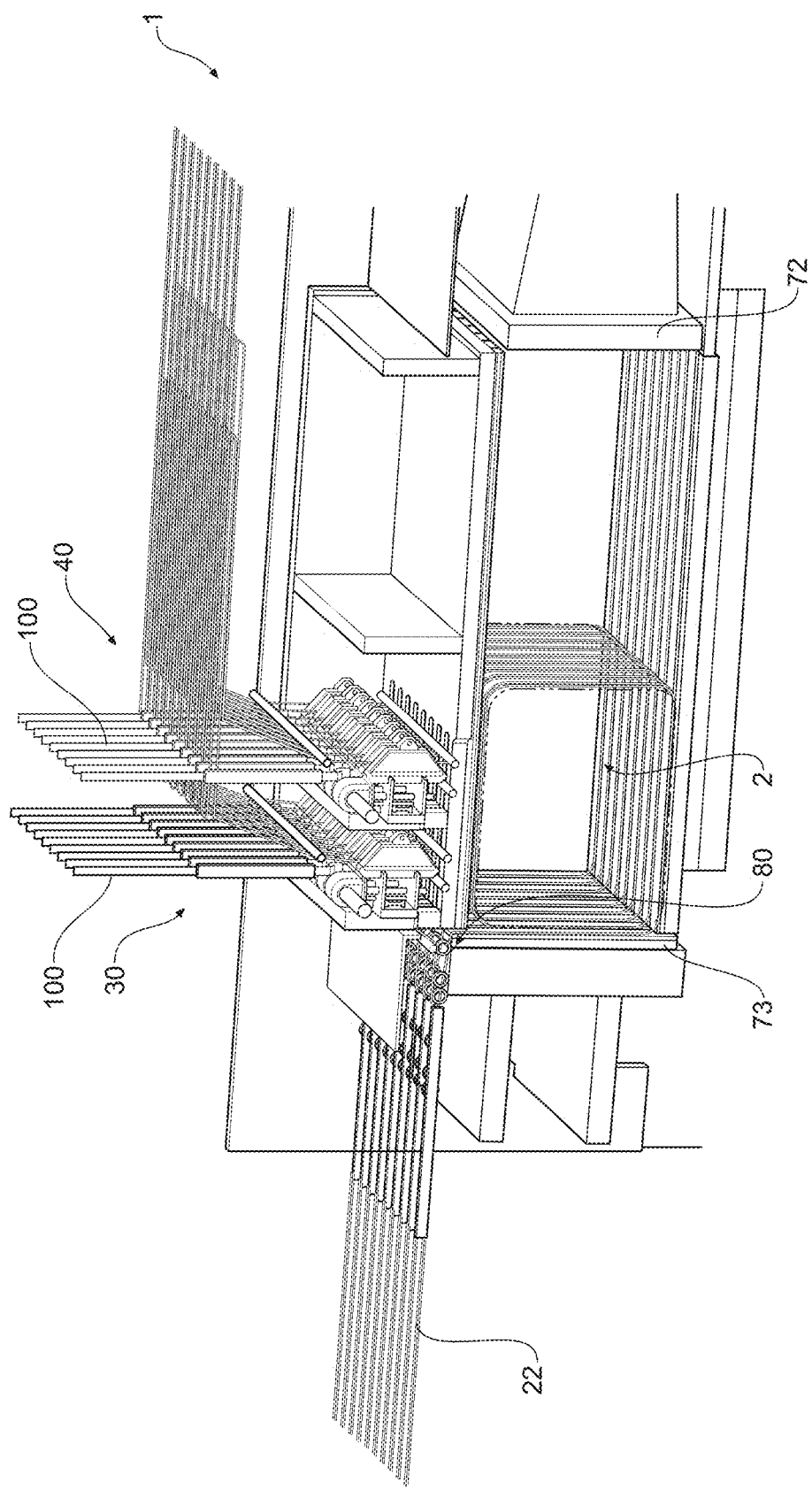

As shown in FIGS. 13 to 15, the platen 72 then retracts from the compressed bale 2, and the roller mechanism 80 withdraws from the receiving channel 10. It can be seen that a small amount of expansion of the compressed bale 2 occurs as the bindings 20 stretch under the expansive forces exerted upon them by the compressed bale 2.

Figure 16:
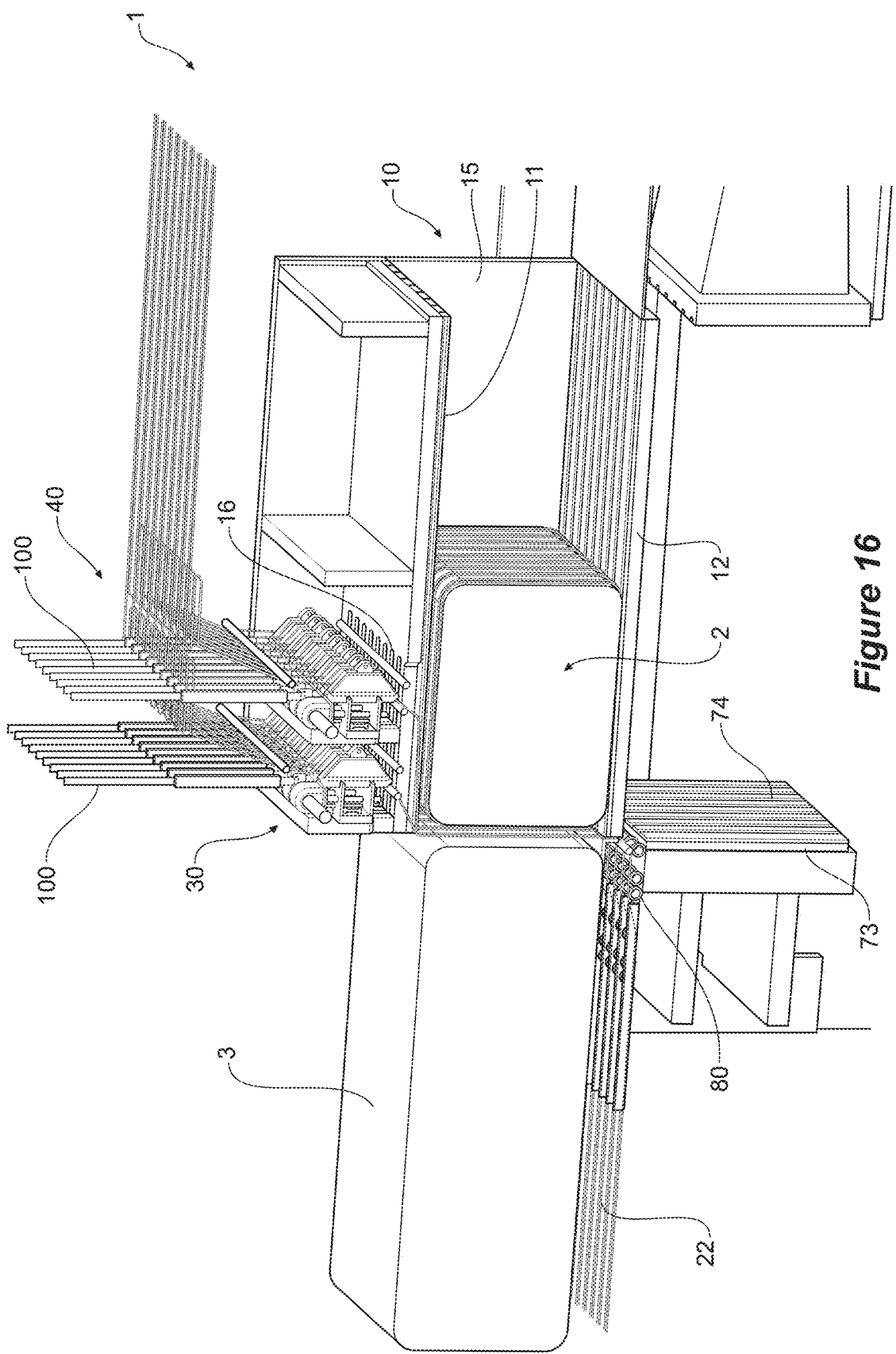
Figure 17:
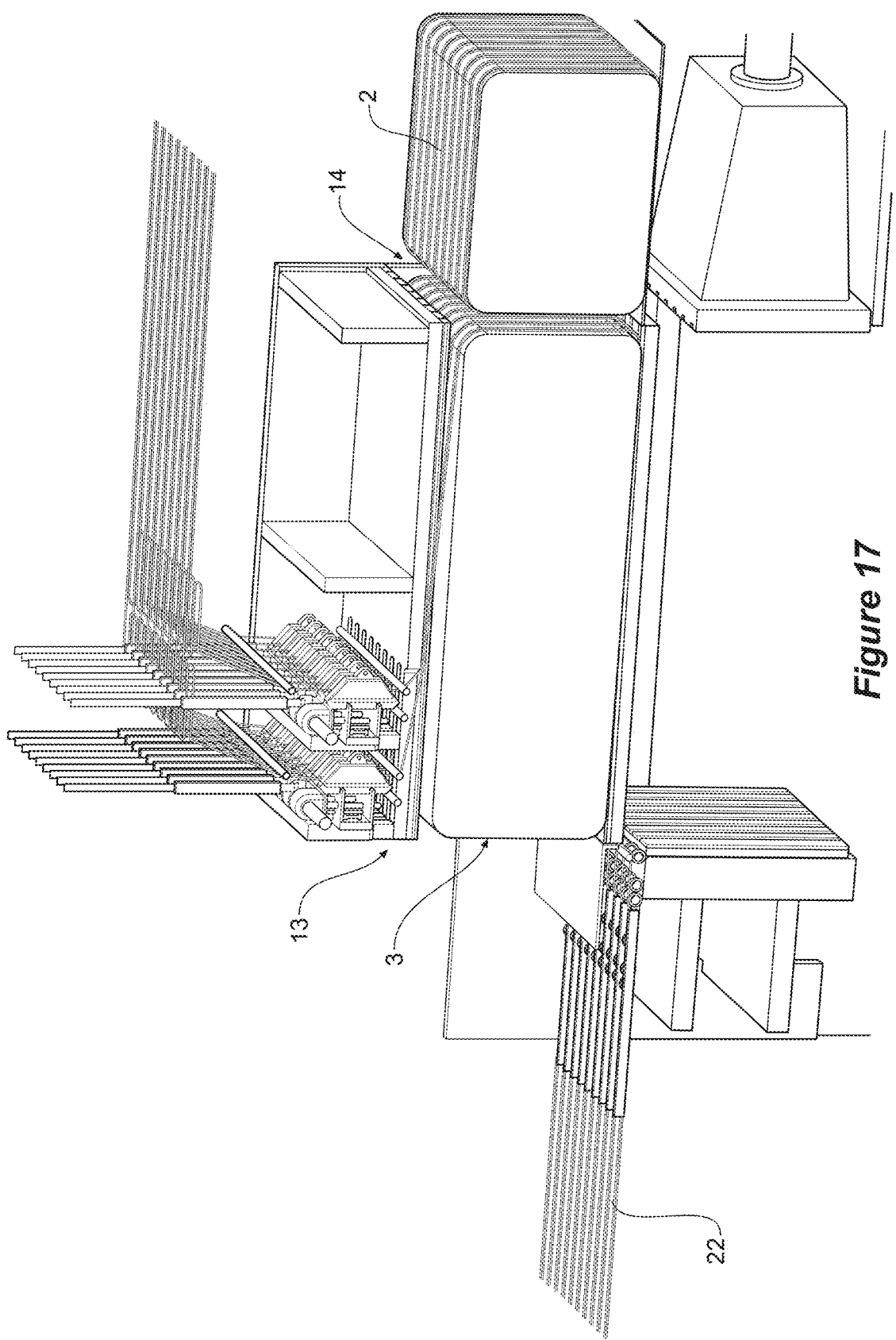

As shown in FIGS. 16 and 17, once the platen 72 is fully retracted, and the roller mechanism 80 has withdrawn, the receiving channel 10 returns to a first position, and a subsequent bale of material 3 to be compressed is pushed in through the first opening 13, which pushes the compressed bale of material 2 out through the second opening 14.

While the embodiment shown and described teaches the binding 20 being delivered to the knotter 30 via the roller mechanism 80 and hook element 100, it will be appreciated that alternative arrangements may be possible. For instance, the knotter 30 maybe inclined relative to the first surface 11 such that an alternative roller mechanism may be capable of delivering the binding to the knotter without the need for the separate hook element, or vice versa.

Figure 24:
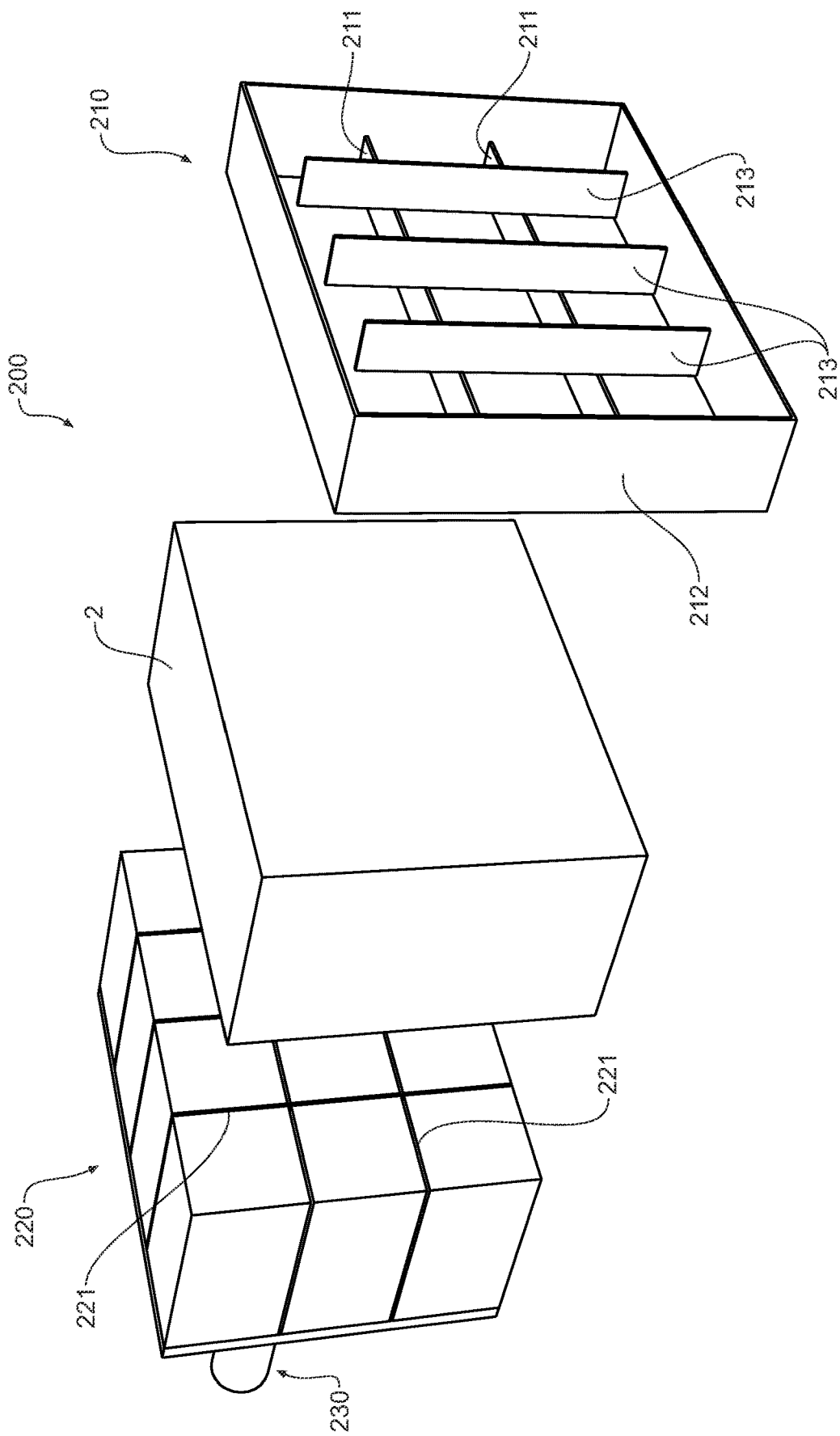
FIG. 24 is a perspective view of a bale cutting device, according to an embodiment.
Figure 25:
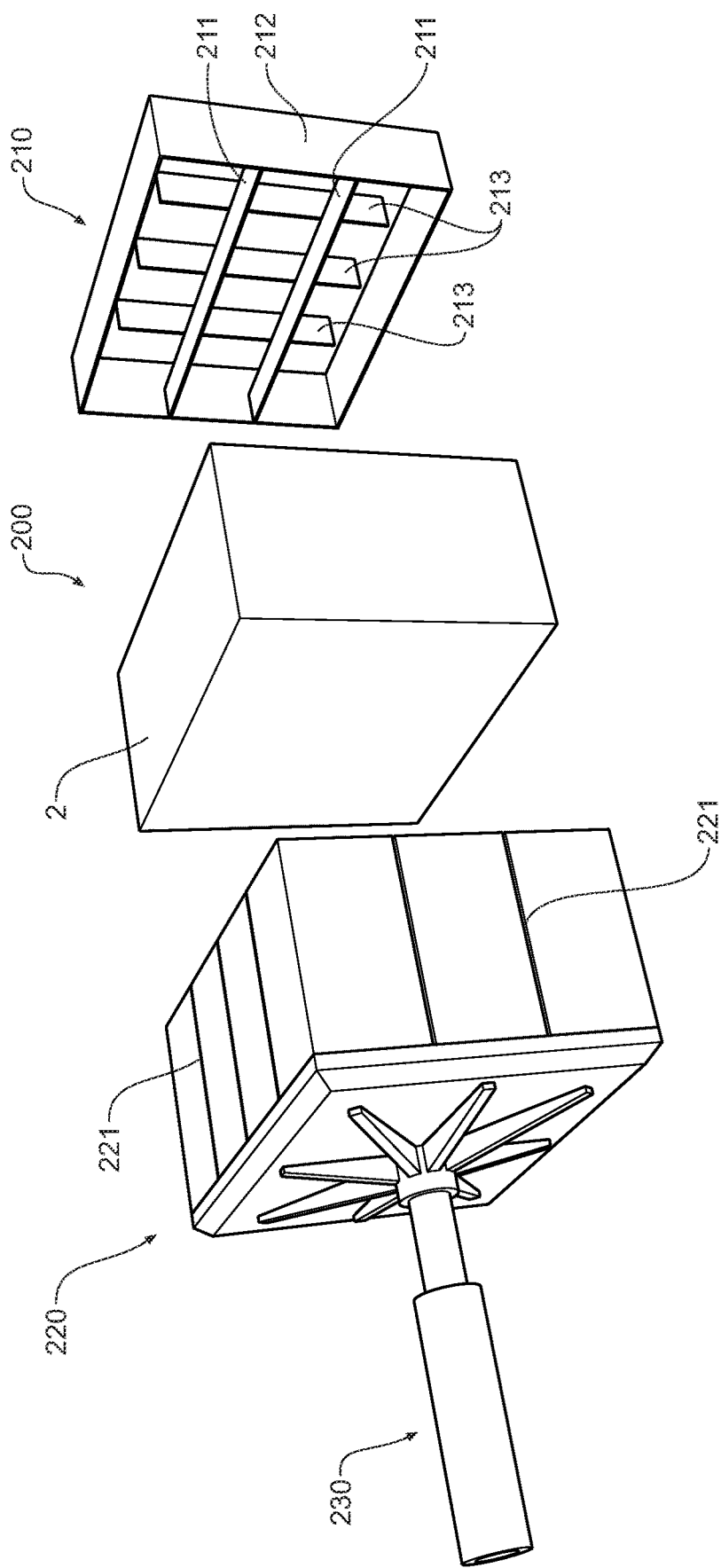
FIG. 25 is an alternate perspective view of the bale cutting device of FIG. 24.
Figure 26:
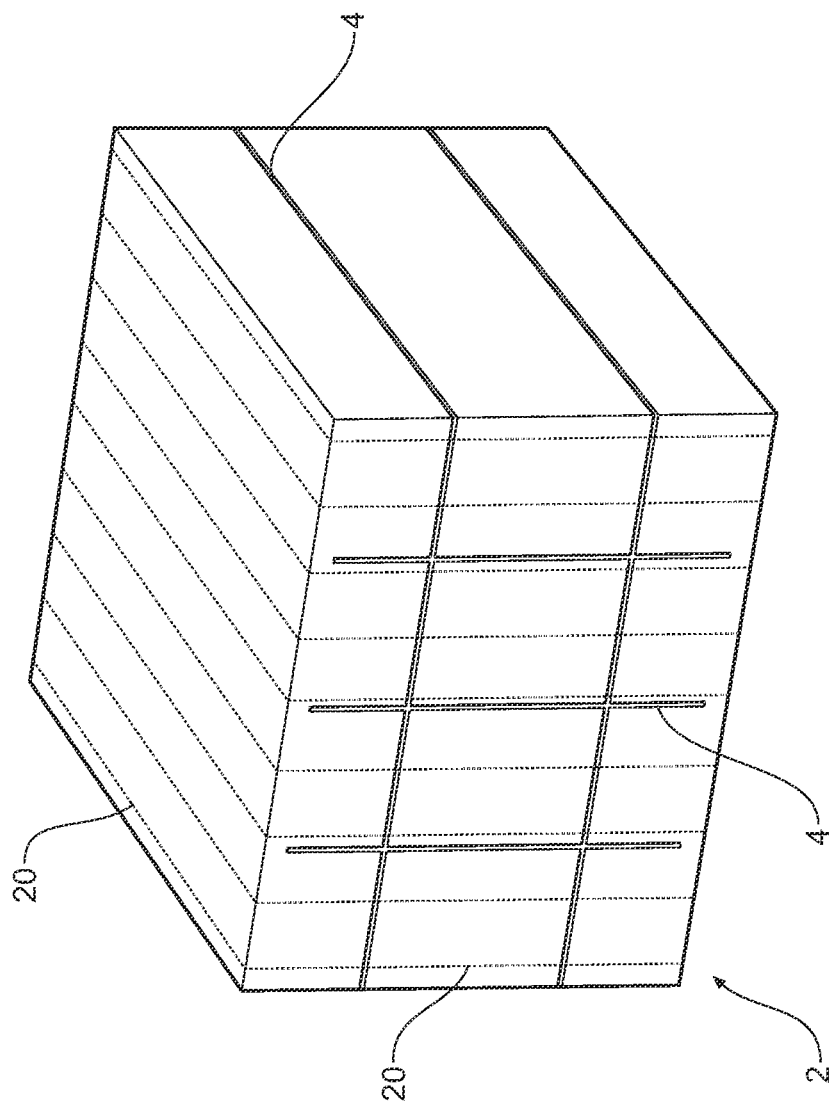
FIG. 26 is a perspective schematic view of a compressed bale which has been processed by the bale cutting device, according to an embodiment.

Referring now to FIGS. 24 and 25, where there is shown a bale cutting device 200, suitable for cutting hay that may be positioned adjacent to the opening of the receiving channel of the bale press. The bale cutting device comprising a blade arrangement 210, and a corresponding platen 220 driven by a hydraulic cylinder 230 configured to push a bale 2 through the blade arrangement 210. The purpose of the bale cutting device 200 is to form cuts in the bale 2 such that there is a reduction in the average fibre length of the bale material which has the effect of improving post processing of the compressed bale material. FIG. 39 provides an example of a compressed bale which has been processed by the bale cutting device. It will be appreciated that the cuts 4 formed in the bale 2 allow for the bale 2 to be readily pulled apart into sections, which can be useful when distributing feed to livestock. Additionally, the reduced average fibre length results in reduced milling time of the bale material.

The blade arrangement 210 features two horizontal blades 211 which are fixed at either end to a support frame 212, and three vertical blades 213 which are fixed to the horizontal blades 211 and are configured such that they don't cut all the way through the top and bottom of the bale 2. It is important not to cut completely through the top and bottom of the bale, as this would result in the bindings 20 pulling through the bale once it has been pressed. The horizontal and vertical blades 211, 213 feature notches (not shown) which allow them to slot into each other.

It will be appreciated that while in this embodiment, there are two horizontal blades 211, and three vertical blades 213, alternative embodiments may feature more or less blades. It will be appreciated that the length and spacing of the blades may be varied depending on the size of the original bale and the type of bale material.

It will be appreciated that in some embodiments the blades may be permanently attached to the support frame 212, and in alternative embodiments the blades may be removably attached to the support frame 212.

The platen 220 features recesses 221 which complement the arrangement of the horizontal and vertical blades of the blade arrangement 210, and enable the platen 220, under the power of the hydraulic cylinder 230 to push a bale 2 completely through the blade arrangement 210 and toward the opening of the receiving channel of the bale press.

In use, the bale press 1 described above can be employed in the following method for compressing bales of material.

The existing weight and dimensions of the bale is determined, and the required compressed dimension for the bale is then calculated.

As shown in FIGS. 1 and 2, the receiving channel of the press is moved to a first position for receiving a bale of material. As shown in FIGS. 3 to 4, the bale 2 is pushed in through the first opening of the receiving channel 10, between the first and second surfaces 11, 12, and the plurality of bindings are drawn around the bale 2, such that they locate over a first end 2*a* and along first and second sides 2*d*, 2*e* of the bale.

Prior to the bale being pushed in through the first opening of the receiving channel, the bale may be optionally processed by the bale cutting device (shown in FIGS. 24 and 25), where the platen 220 pushes the bale 2 through the blade arrangement 210 and toward the first opening 13 of the receiving channel 10.

As shown in FIG. 6, once the bale 2 is completely received within the receiving channel 10, the receiving channel 10 is moved to a second position for compression of the bale 2, where the bindings extend over the second end 2*b* of the bale, such that the bindings are applied around the bale 2.

As shown in FIG. 7, the second surface 12 is moved toward the first surface to apply a small amount of compression to the bale in order to slightly reduce the height of the compressed bale.

As shown in FIGS. 8 to 9, the press then compresses the bale (the bale being represented with dotted lines) to the required compressed dimension, while the binding applicator withdraws excess binding from around the bale.

As shown in FIGS. 10 to 12, the roller mechanism then guides the binding underneath the knotter 30, 40, where the hook element 100 draws the binding through the knotter and the knotter performs the double knotting operation.

As shown in FIGS. 13 to 15, the press 70 and roller mechanism 80 then withdraw from the receiving channel 10, allowing the compressed bale to expand as the binding stretches under the expansive forces exerted upon it by the compressed bale.

As shown in FIG. 16, the receiving channel 10 then returns to a first position, and as shown in FIG. 17, a subsequent bale of material 3 is pushed through the first opening 13, which pushes the compressed bale 2 out through the second opening 14.

It will be appreciated that the bale press described is capable of compressing and binding a bale of material to any required compressed dimension within the range of motion of the press, allowing bales of various required dimensions to be produced.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A bale press for compressing and binding bales of material, the bale press comprising a bale binder, the bale binder comprising:
    a first binding applicator configured to simultaneously apply a first plurality of spaced apart bindings around a bale of material;
    a second binding applicator configured to simultaneously apply a second plurality of spaced apart bindings around the bale of material;
    a first row of connecting devices configured to connect ends of each of the first plurality of bindings to form a plurality of complete loops around a perimeter of the bale of material; and
    a second row of connecting devices configured to connect ends of each of the second plurality of bindings to form a plurality of complete loops around the perimeter of the bale of material,
    wherein the first and second binding applicators and the first and second rows of connecting devices are configured such that the plurality of bindings from the respective binding applicators are applied around the bale of material without crossing over or tangling, and wherein the first row of connecting devices and the second rows of connecting devices are parallel with one another.

2. The bale press as claimed in claim 1, wherein the first and second binding applicators and the first and second rows of connecting devices are misaligned from one another such that the bindings from each of the first and second binding applicators are applied in an alternating fashion across the width of the bale.

3. The bale press as claimed in claim 1, further comprising a receiving channel, having first and second parallel surfaces separated by a defined distance, the receiving channel having a first opening at one end and a second opening at an opposing end, wherein the bale of material to be bound is pushed in through the first opening between the first and second surfaces, and wherein the bound bale is pushed out through the second opening.

4. The bale press as claimed in claim 3, wherein bindings from both the first and second binding applicators extend between the first and second surfaces of the receiving channel so that as the bale of material is pushed in between the first and second surfaces, each of the bindings are drawn around the bale of material such that they are located over a first end and along first and second sides of the bale.

5. The bale press as claimed in claim 1, wherein each of the bindings are a twine, and wherein the first and second rows of connecting devices are in the form of a plurality of double-knot twine knotters mounted next to one another in a row along a common driveshaft.

* * * * *

UNITED STATES PATENT AND TRADEMARK OFFICE
CERTIFICATE OF CORRECTION

PATENT NO. : 12,311,630 B2
APPLICATION NO. : 18/639270
DATED : May 27, 2025
INVENTOR(S) : Stuart Price Page 1 of 1

It is certified that error appears in the above-identified patent and that said Letters Patent is hereby corrected as shown below:

In the Specification

Column 1, Lines 10-11, delete "20/189,00652" and insert -- 2018900652 --

Signed and Sealed this
Twenty-ninth Day of July, 2025

Coke Morgan Stewart
*Acting Director of the United States Patent and Trademark Office*